(12) United States Patent
Liu et al.

(10) Patent No.: US 7,706,593 B2
(45) Date of Patent: Apr. 27, 2010

(54) VERIFICATION METHOD FOR DETERMINING AREAS WITHIN AN IMAGE CORRESPONDING TO MONETARY BANKNOTES

(75) Inventors: Xu-Hua Liu, Los Angeles, CA (US);
Byung-Tae Oh, Los Angeles, CA (US);
Young-Min Kwak, Gardena, CA (US);
Chung-Chieh Kuo, Taipei (TW);
Chen-Ning Hsi, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 875 days.

(21) Appl. No.: 11/533,761

(22) Filed: Sep. 20, 2006

(65) Prior Publication Data

US 2008/0069427 A1    Mar. 20, 2008

(51) Int. Cl.
*G06K 9/00* (2006.01)
(52) U.S. Cl. .................................................. 382/135
(58) Field of Classification Search ................ 382/100, 382/135–138, 173, 176, 165, 190; 364/724.12; 358/2.1, 3.24
See application file for complete search history.

(56) References Cited

U.S. PATENT DOCUMENTS

| | | | |
|---|---|---|---|
| 5,533,144 A | 7/1996 | Fan | |
| 5,638,496 A | 6/1997 | Sato | |
| 6,026,186 A | 2/2000 | Fan | |
| 6,067,374 A | 5/2000 | Fan et al. | |
| 6,181,813 B1 | 1/2001 | Fan et al. | |
| 6,256,412 B1 | 7/2001 | Miyazawa et al. | |
| 6,317,524 B1 | 11/2001 | Wu et al. | |
| 6,343,204 B1 | 1/2002 | Yang | |
| 6,473,202 B1 * | 10/2002 | Kanata et al. | 358/2.1 |
| 6,515,764 B1 | 2/2003 | Knox et al. | |
| 6,516,078 B1 | 2/2003 | Yang et al. | |
| 6,542,629 B1 | 4/2003 | Wu et al. | |
| 6,574,366 B1 | 6/2003 | Fan | |
| 6,580,820 B1 * | 6/2003 | Fan | 382/135 |
| 6,731,784 B2 | 5/2004 | Yang | |
| RE38,716 E * | 3/2005 | Caspi et al. | 382/141 |
| 2002/0146167 A1 | 10/2002 | Imamura | |
| 2004/0247169 A1 | 12/2004 | Ross | |
| 2005/0100204 A1 * | 5/2005 | Afzal et al. | 382/135 |

* cited by examiner

*Primary Examiner*—Charles Kim
*Assistant Examiner*—Claire Wang
(74) *Attorney, Agent, or Firm*—Winston Hsu

(57) ABSTRACT

A method for verifying areas within an image corresponding to monetary banknotes includes: dividing the image into a plurality of verification sections; generating a banknote boundary map having border sections corresponding to boundaries of valid monetary banknotes; generating a texture decision map from the image having texture sections each having texture values within a valid range according to a valid monetary banknote, determining objects in the texture decision map by removing texture sections in the texture decision map corresponding to border sections in the banknote boundary map; calculating a texture property value for objects according to texture feature values for each verification section; calculating shape property values for each object; and further removing texture sections from the texture decision map corresponding to objects that do not have the texture property value within a first predetermined range and the shape property value within a second predetermined range.

50 Claims, 30 Drawing Sheets

21(b)

21(a)

| 1 | 1 | 1 | 0 | 1 | 1 | 1 | 1 | 1 | 0 |
|---|---|---|---|---|---|---|---|---|---|
| 1 | 0 | 1 | 1 | 1 | 1 | 1 | 1 | 1 | 0 |
| 0 | 1 | 0 | 1 | 1 | 0 | 0 | 1 | 1 | 0 |
| 0 | 1 | 0 | 0 | 1 | 0 | 0 | 1 | 1 | 0 |
| 1 | 0 | 1 | 1 | 1 | 1 | 1 | 0 | 1 | 0 |
| 0 | 1 | 1 | 1 | 1 | 1 | 0 | 1 | 1 | 0 |
| 1 | 1 | 0 | 1 | 1 | 0 | 1 | 1 | 1 | 0 |
| 0 | 1 | 1 | 1 | 1 | 1 | 0 | 1 | 0 | 1 |
| 0 | 0 | 0 | 0 | 0 | 0 | 1 | 1 | 1 | 1 |
| 1 | 0 | 1 | 0 | 1 | 0 | 1 | 1 | 1 | 1 |

Fig. 22

VERIFICATION METHOD FOR DETERMINING AREAS WITHIN AN IMAGE CORRESPONDING TO MONETARY BANKNOTES

BACKGROUND OF THE INVENTION

1. Field of the Invention

The present invention relates to image processing, more particularly, to a verification method for determining areas within an image corresponding to monetary banknotes.

2. Description of the Prior Art

Improvements in graphics and image duplication systems, which can include scanners, digital color copiers, and printing machinery and apparatuses, has also contributed to the increase in illegal counterfeit reproduction of various items. Counterfeiters nowadays commonly attempt the reproduction of monetary banknotes, currencies, stocks, bonds, and other valuable items for personal gain and profit. The task of distinguishing and discerning between legitimate items and copied fakes becomes increasingly difficult as printing and reproduction improvements allow copiers to reproduce banknotes that are virtually identical to legitimate ones. Therefore, there is a need to be able to effectively and precisely discern and distinguish counterfeited banknotes from authentic ones.

Banknote detection systems today typically incorporate a scanner or scanning mechanism of sorts. This converts information from a sample banknote into a digital data format representation for image processing. Once converted into digital data, a series of tests and procedures can be performed in order to confirm the validity of the sample banknote. This may include the identification of key features, such as landmarks, holograms, colors, serial numbers and pigments.

An important aspect of counterfeit currency detection prior to identification of key features involves the verification of areas corresponding to the monetary banknote within the scanned image. Often times, the size of the image is greater than that of the banknote. The valid location of banknotes within the image is thus required so that relevant counterfeiting tests can be performed on the confirmed areas, and not on the background image. Additionally, knowing the areas corresponding to the banknote will allow determination of a coordinate system for referencing in further tests.

If the banknote is scanned while imposed on a complicated background, the difficulty associated with distinguishing the actual banknote location increases. Background noise and patterns may further complicate the detection process. This may introduce irregularities, and invalid background objects can be misinterpreted as a banknote location. Variations in the shift, rotation and alignment of banknotes within the image may also complicate identification processes as a set frame of reference cannot be initially implemented.

Without the proper verification of banknote locations within a scanned image, being separated from the background image, optimal conditions for accurate counterfeit currency detection cannot be met.

SUMMARY OF THE INVENTION

Therefore, one objective of the claimed invention is therefore to provide a verification method for determining areas within an image corresponding to monetary banknotes, to solve the above-mentioned problem.

According to an exemplary embodiment of the claimed invention, a verification method for determining areas within an image corresponding to monetary banknotes is disclosed. The method comprising: dividing the image into a plurality of verification sections; generating a banknote boundary map having border sections corresponding to a boundary of valid monetary banknotes within the image; generating a texture decision map from the image having texture sections, the texture sections each having texture values within a valid range according to a valid monetary banknote, wherein generating the texture decision map includes: dividing the image into a plurality of feature sections; generating a texture feature map having texture values for each feature section; including the border sections within the texture sections; selecting feature sections having texture values within a first texture value threshold range as potential texture sections; determining an average texture value for surrounding feature sections of each potential texture section; and further including potential texture sections having surrounding feature sections with the average texture value within a second texture value threshold range within the texture sections, determining a number of objects in the texture decision map by removing texture sections in the texture decision map that correspond to the border sections in the banknote boundary map; calculating a texture property value for each object according to a texture feature map having a texture feature value for each verification section; calculating a shape property value for each object; and further removing texture sections from the texture decision map corresponding to objects that do not have the texture property value within a first predetermined range and the shape property value within a second predetermined range.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 22 illustrates an exemplary embodiment of the binary edge map.

DETAILED DESCRIPTION

Figure 1:
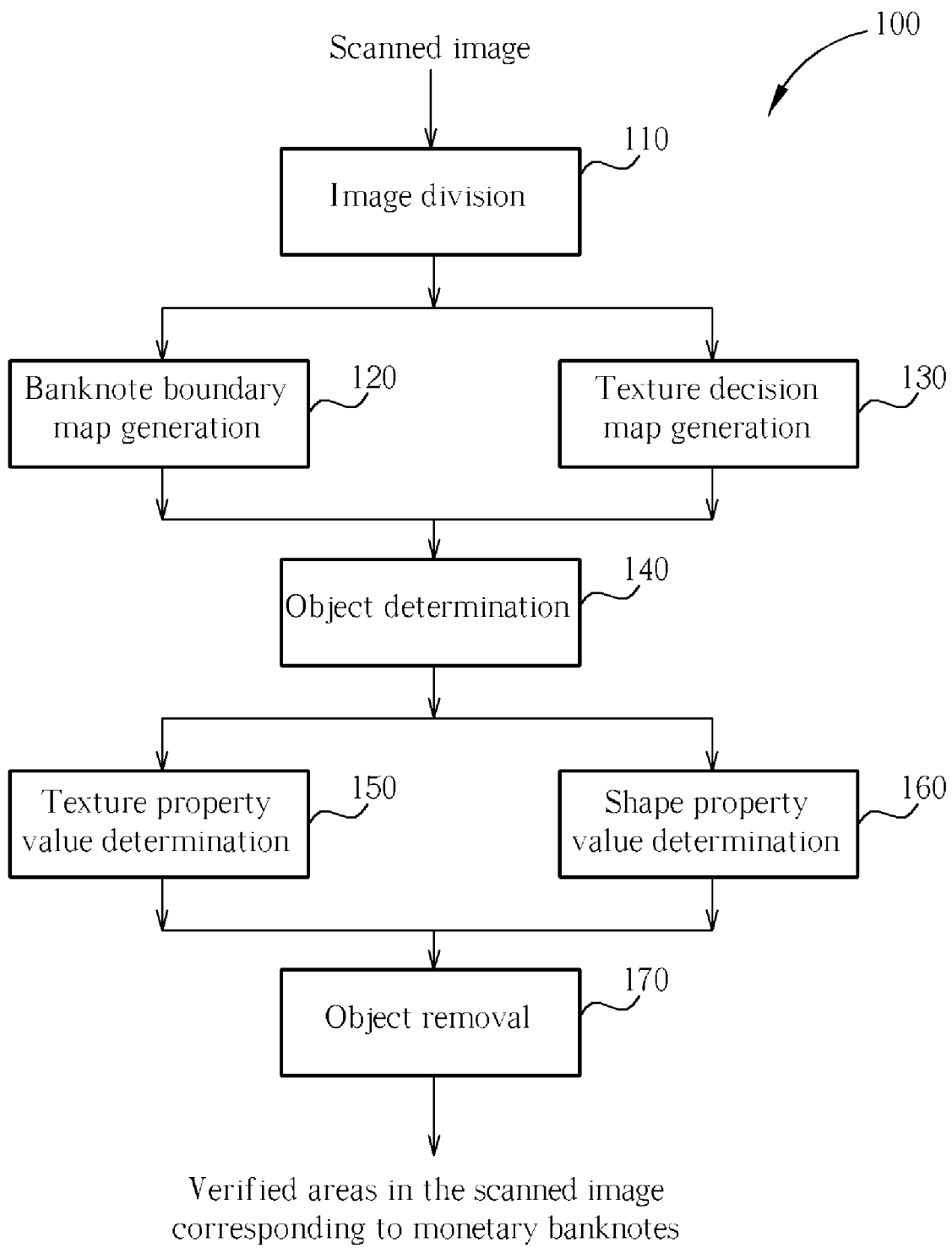
FIG. 1 illustrates an overview of the verification method for determining areas within an image corresponding to monetary banknotes.

The present invention contained herein within provides a verification method for determining areas within an image corresponding to monetary banknotes. The image can be provided from a hardware scanner or a similar device, where the image can contain sample monetary banknotes of a predetermined currency type. Characteristics derived from areas within the sample image are compared with known values and/or ranges corresponding to valid monetary banknotes to verify its location within the sample image. The types of currencies can include United States of America currency and Japanese denomination currencies, but additional embodiments can also include currencies of other nationalities.

The described method can be applied for use in the detection of counterfeit currency. The scanned image can provide the sample monetary banknotes with an arbitrary rotational shift alignment within the image. This allows a common scanner to be used, instead of a simple banknote reader with fixed input dimensions. Additionally, the scanned image can contain the sample monetary banknotes while superimposed onto an arbitrary background, can contain multiple isolated or independent banknotes, or have overlapping banknotes. The method can be used in conjunction with basic stand-alone scanners, copiers, stand-alone printers, and other related detection and scanning hardware.

The verification method described in this present invention makes use of new innovations not introduced by the prior art. This not only provides an increased means of security measures when used in application for counterfeit banknote detection, it also provides ease of integration with common hardware devices and a viable low cost approach. The multi-level, large and small-scale approaches of this method help ensure accurate detection rates and low false alarm rates. It is also robust and flexible enough to be applied to a wide variety of image types and conditions.

Prior to a concise description of the present invention verification method, it is important to understand that certain terms used throughout the following description and claims will refer to particular processes or steps. As one skilled in the art will appreciate, designers may refer to such processes by different names. This document does not intend to distinguish between items that differ in name but not function. In the following discussion and in the claims, the terms "including" and "comprising" are used in an open-ended fashion, and thus should be interpreted to mean "including, but not limited to . . . ". Other examples are equally applicable, and should be understood to those familiar with the proper terminology of the related art.

An overview of the verification method for determining areas within an image corresponding to monetary banknotes is illustrated with reference to FIG. 1. The method 100 first comprises of receiving a scanned image, which possibly contains the sample monetary banknotes. Upon receiving the scanned image, image division 110 is performed to separate the image into multiple verification sections. Banknote boundary map generation 120 is subsequently performed to create a banknote boundary map having border sections corresponding to a boundary of valid monetary banknotes within the image. At the same time, texture decision map generation 130 operates to create a texture decision map having texture sections. The texture sections each possess texture values within a valid range according to the texture of a valid monetary banknote. Generation of the texture decision map will be discussed later in greater detail.

Object determination 140 manages to isolate and count objects in the texture decision map. An object ideally corresponds to a monetary banknote, but may include other identified items in the texture decision map. Each object is separated from each other by removing texture sections in the texture decision map that correspond to the border sections in the banknote boundary map.

Following object determination 140 are texture property determination 150, and shape property determination 160, each performed on identified objects in the prior step. Texture property determination 150 calculates a texture property value for each object according to a texture feature map having a texture feature value for each image section. Different types of texture feature maps are applicable in this step, and will be described more thoroughly to follow. Shape property determination 160 calculates a shape property value for each object.

Based on the results of texture property determination 150 and shape property determination 160, object removal 170 operates by further removing texture sections from the texture decision map corresponding to objects that do not have the texture property value within a first predetermined range and the shape property value within a second predetermined range. Simply put, objects that do not have both an appropriate texture property value and shape property value are removed from the texture decision map. The first and second predetermined ranges both correspond to proper ranges of valid monetary banknotes to ensure accuracy. The resulting texture decision map therefore displays verified areas corresponding to monetary banknotes in the scanned image.

A detailed description for each of the above identified process steps shown in FIG. 1 will be discussed below, including relevant figures and diagrams for each section.

Image Division 110

Figure 2:
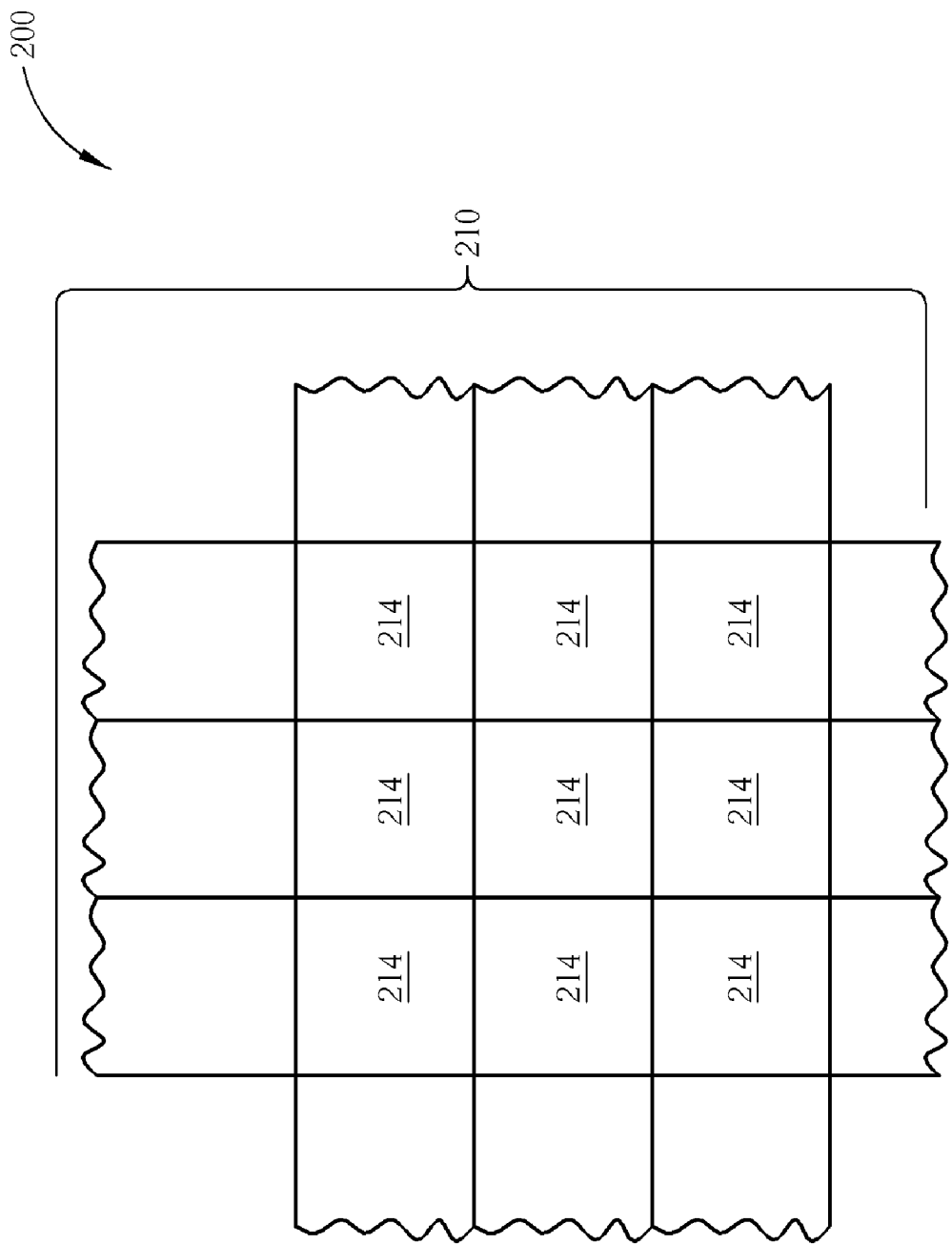
FIG. 2 illustrates an exemplary embodiment of a scanned image divided into a plurality of verification sections.
Figure 3:
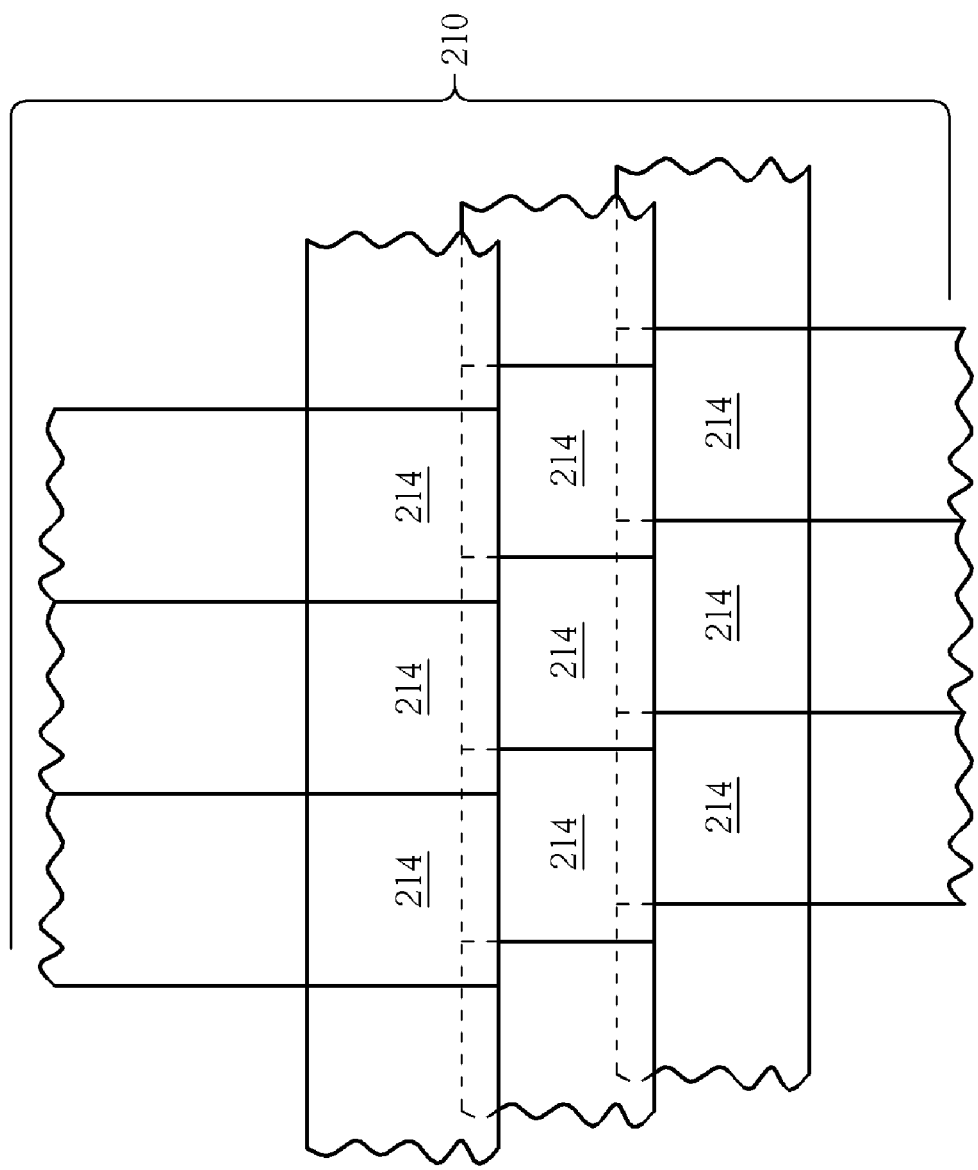
FIG. 3 illustrates an embodiment of the plurality of verification sections configured in an overlapping manner.

The goal of image division 110 is to divide a scanned image into multiple verification sections for computational efficiency. Each verification section can then be processed individually, as opposed to an entire image, to provide for a greater resolution in related calculations and processes. The size and shape of the verification sections can vary according to various embodiments of the present invention, and in no way or form influence the teachings provided herein below. FIG. 2 illustrates an exemplary embodiment of a scanned image divided into a plurality of verification sections 210. The plurality of verification sections 210 comprises several individual verification sections 214. Although FIG. 2 illustrates the image divided into a fitted manner, other embodiments may employ an overlapping distribution, such as shown in FIG. 3. This exemplary embodiment illustrates where the plurality of verification sections are overlapping, to provide an even greater resolution for following calculations and procedural steps.

Banknote Boundary Map Generation 120

Figure 4:
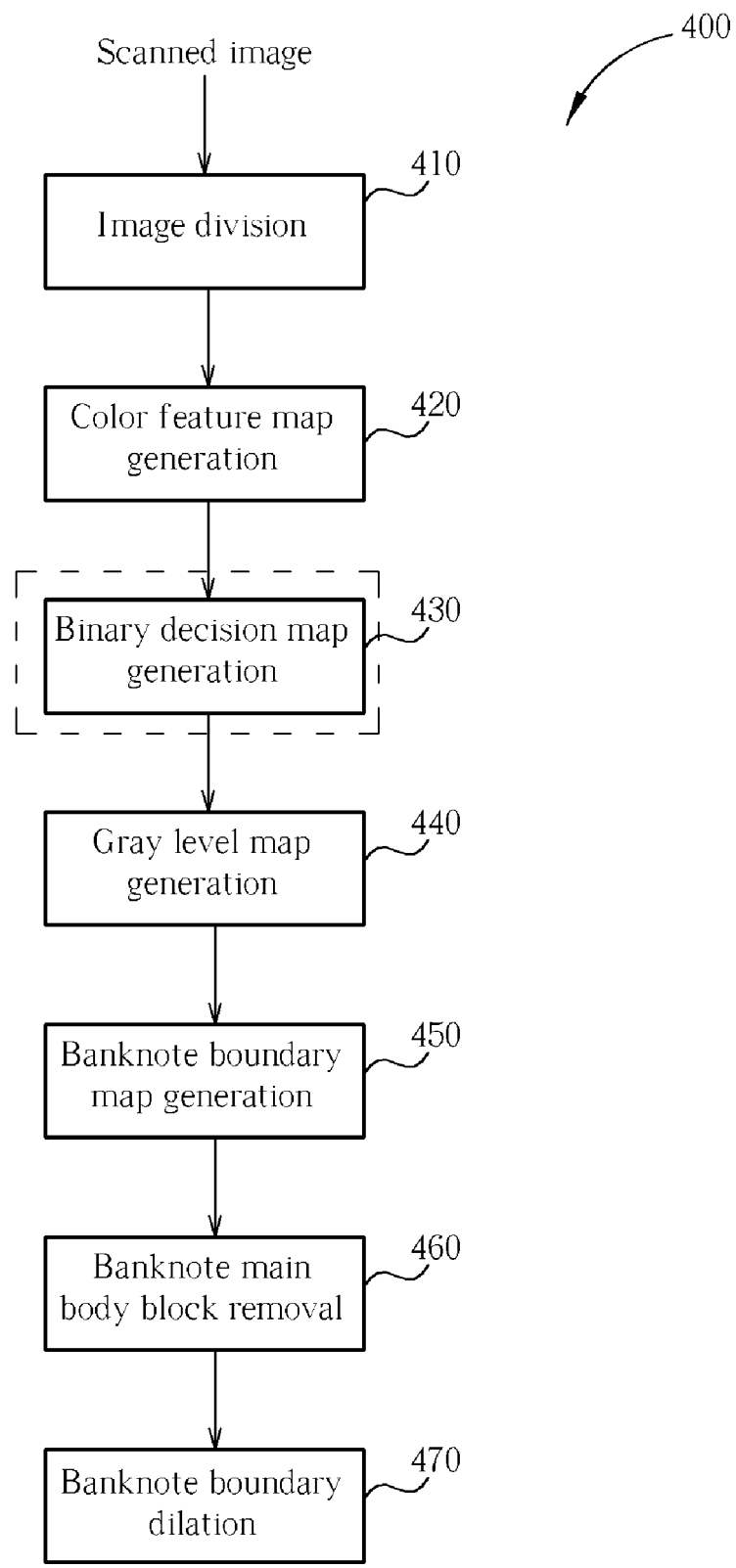
FIG. 4 illustrates generation of the banknote boundary map.

Banknote boundary map generation 120 focuses on the creation of a banknote boundary map. FIG. 4 illustrates this process. The banknote boundary map is derived from the scanned image containing monetary banknotes. Border sections, which correspond to a boundary of monetary banknotes within the scanned image, are selected and identified. Thus the banknote boundary map highlights the perimeter boundary areas of monetary banknotes if they are included in an original image scan.

FIG. 4 provides an exemplary embodiment describing how to generate the banknote boundary map according to the present invention. As many methods may exist, the description below is provided for illustrative purposes, and is not intended to reduce to scope of the present invention. Alternate embodiments of the present invention may also generate the banknote boundary map in different manners or a different order than illustrated. Therefore, any applicable method may be used as long as it suffices in producing a banknote boundary map in accordance with the goals of the present invention.

From FIG. 4, a digitally scanned image is first received. Image division 410 then occurs, where the scanned image is divided into a plurality of image sections. Color feature map generation 420 then follows, where a color feature map is created containing color histogram data for each image section. Binary decision map generation 430 is an additional step included in an alternate embodiment of the present invention. A color binary decision map is created in this step, indicating probable areas in the image corresponding to the banknotes. The next step is gray level map generation 440, where a gray level feature map is created to indicate a gray level value for each image section. Banknote boundary map generation 250 follows, where border sections are recorded onto a banknote boundary map. The border sections are chosen from the image sections having color histogram data within a predetermined color range and gray levels within a predetermined gray level range. The internal border sections enclosed by perimeter border sections are then removed from the banknote boundary map in the banknote main body block removal 460 step. Finally, perimeter border sections are dilated on the banknote boundary map in the banknote boundary dilation 470 step.

Each relevant section above in banknote boundary map generation process illustrated in FIG. 4 is further detailed below.

Image Division 410

During Image division 410 from FIG. 4, the received image is divided into a plurality of image sections. This can be performed in a manner similar to FIG. 2 and FIG. 3 as shown for the verification sections, and therefore does not require further discussion. In certain embodiments, the image sections may also correspond to the verification sections. The division of the input image into image sections simply allows for increased computational efficiency in the banknote boundary map generation step. The image sections can be arbitrarily shaped as blocks, or any other configuration, be fitted, or overlapping, so long as the teachings of the present invention are maintained.

Color Feature Map Generation 420

Figure 5:
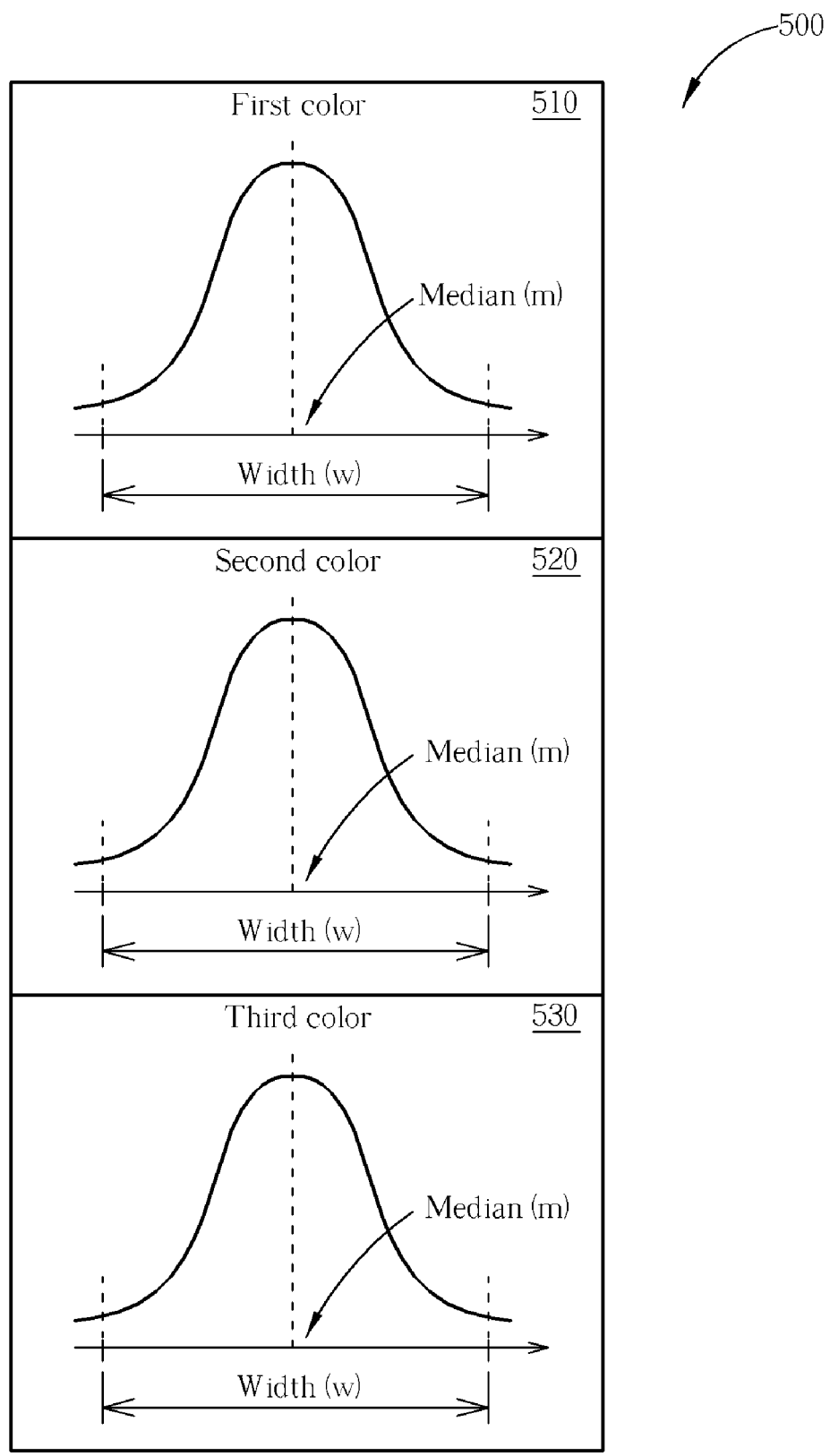
FIG. 5 is an embodiment illustrating color histogram data.
Figure 6:
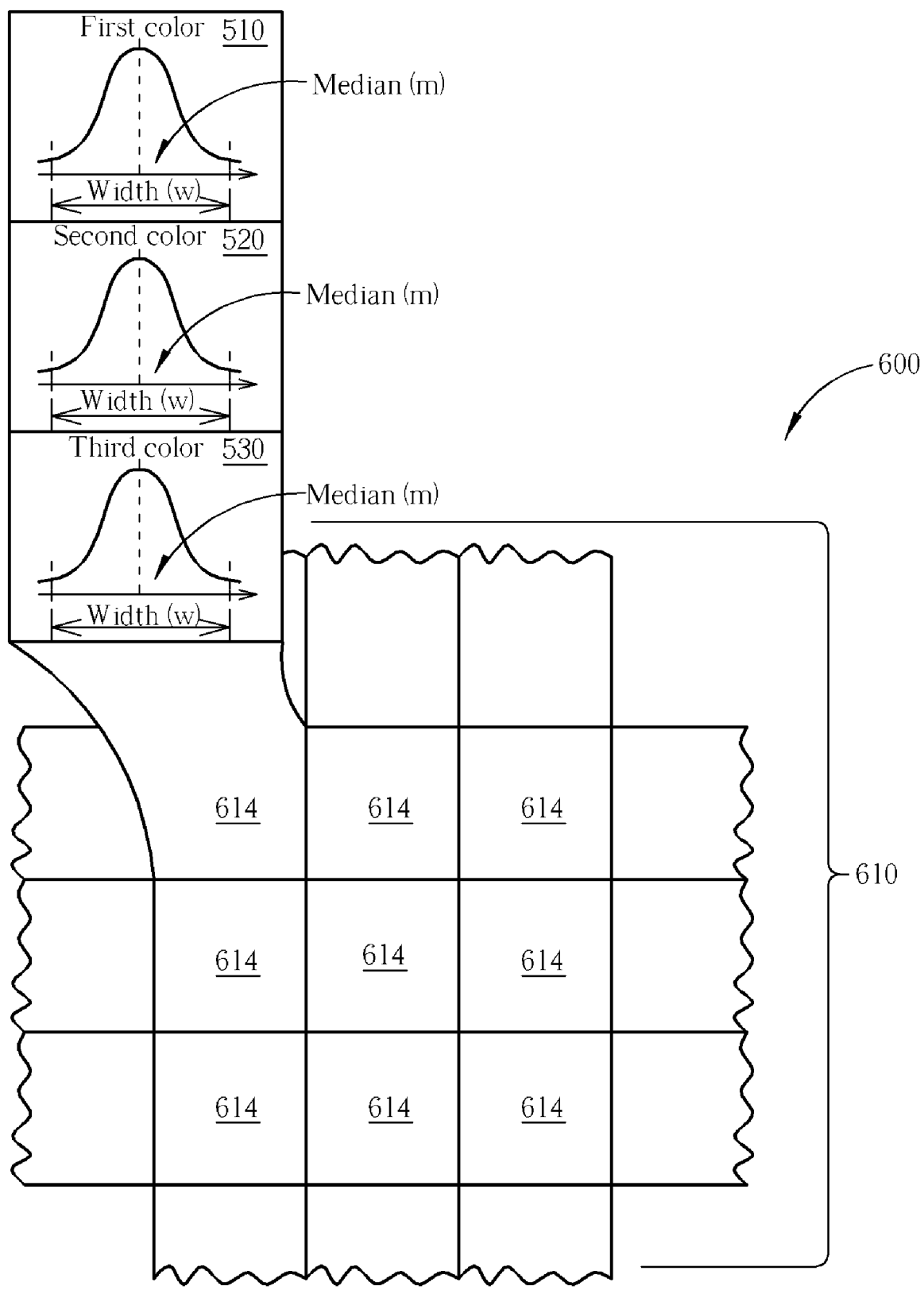
FIG. 6 illustrates color histogram data being extracted for each image section.

Color feature map generation 420 entails generating a color feature map containing color histogram data for each image section. An example of color histogram data is provided in FIG. 5 and FIG. 6. As shown in FIG. 5, histogram data for each respective color (510, 520, 530) comprises a width value, and a median value. In an embodiment of the present invention illustrated through FIG. 6, each image section 614 of the scanned image 610 comprises a width and median value for the color histogram for a first color 510, a width and median value for the color histogram for a second color 520, and a width and median value for the color histogram for a third color 530. The color histogram data can comprise red green blue (RGB) color histogram data. As the extraction of color histogram data is well known to those familiar in the related art, further detail is omitted for brevity.

Gray Level Map Generation 440

Figure 7:
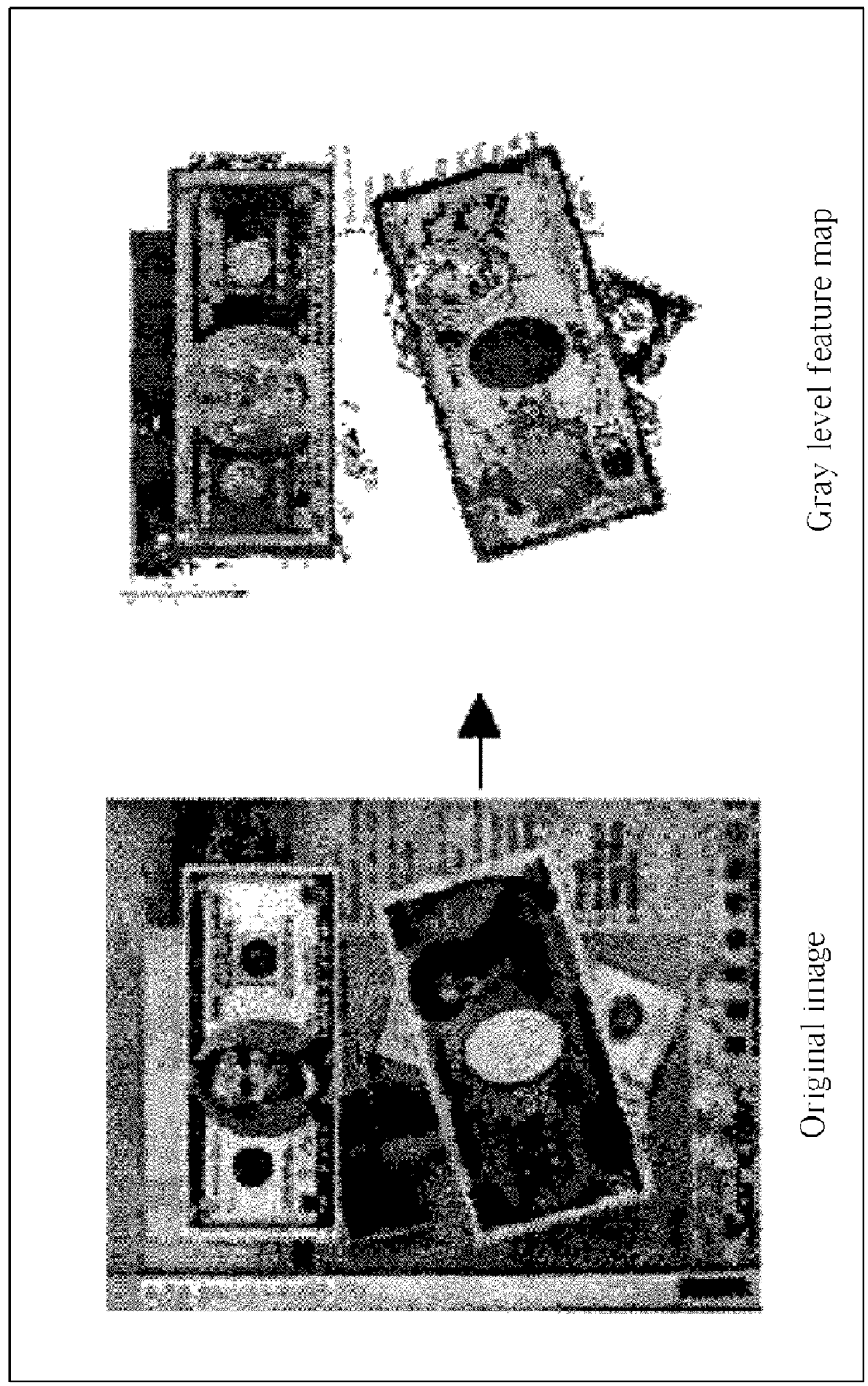
FIG. 7 is an embodiment illustrating gray level feature map generation.

In gray level map generation 440, a gray level feature map is created that indicates a gray level value for each image section. An exemplary illustration is shown in FIG. 7. Each image section of the image is analyzed, and processed to determine a corresponding gray level for the section. As monetary banknotes typically possess a unique gray level within a specified variance level, this data is used in later processes of boundary detection. Gray level analysis is well known to those involved in the related art, and therefore further discussion in this regard is omitted.

Banknote Boundary Map Generation 450

Figure 8:
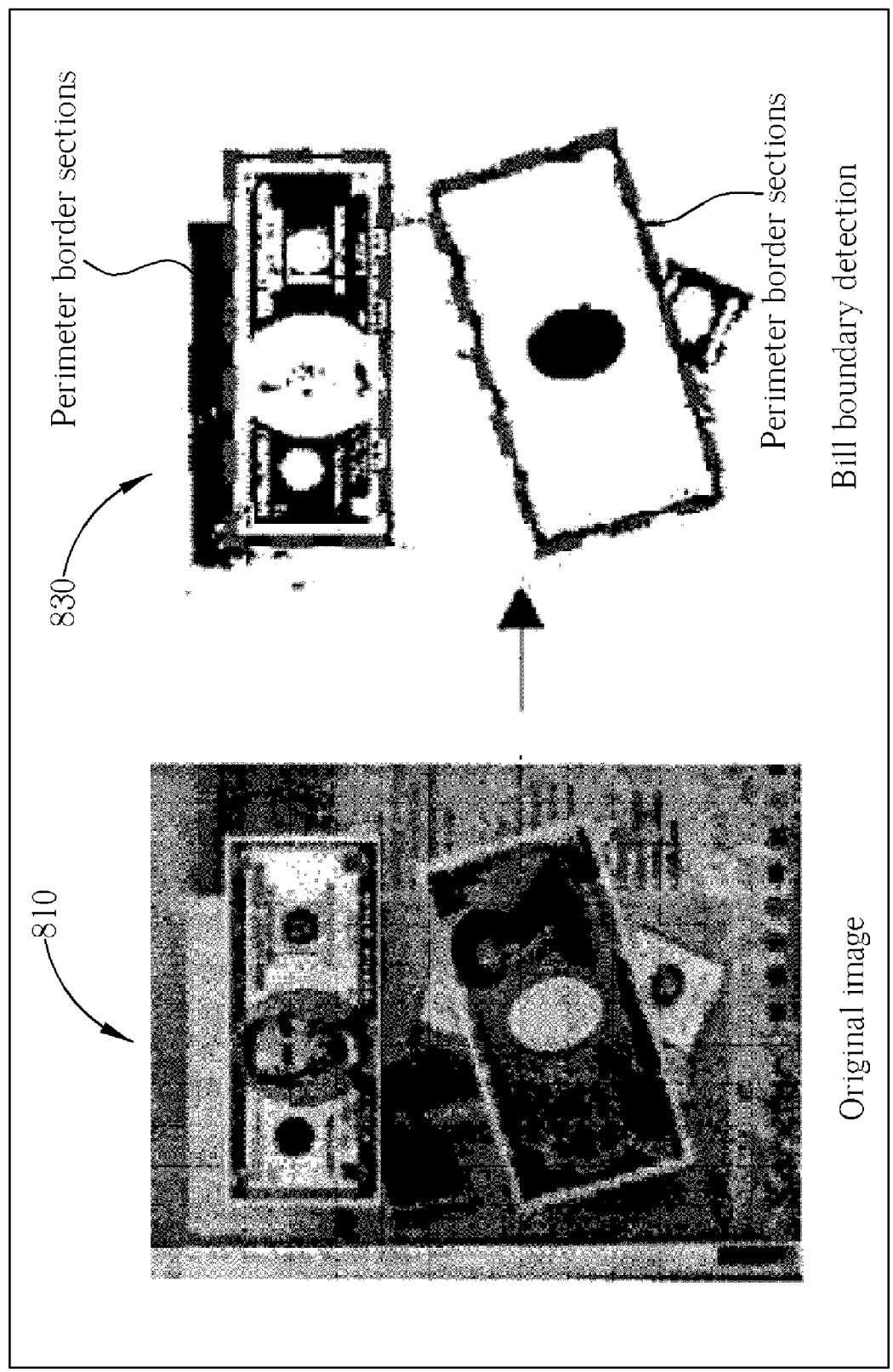
FIG. 8 is an embodiment illustrating banknote boundary map generation.

Banknote boundary map generation 450 is a pivotal step in which border sections are determined from data in the previous steps, mainly the color feature map from 420, and the gray level map from 440. In this step, image sections having color histogram data within a predetermined color range, and also having gray levels within a predetermined gray level range, are identified as border sections and recorded onto the banknote boundary map. The predetermined color range is based on color histogram data for a border of a valid monetary banknote, while the predetermined gray level range is based on gray levels for a border of a valid monetary banknote. Therefore, as the predetermined ranges above are specifically tuned according to border information of a valid banknote, this step appropriately selects border sections using the correct criteria. This step is further illustrated in FIG. 8, showing an original image 810, and image sections meeting the criteria above selected as the border sections in the banknote boundary map 830.

Typically, a border of a monetary banknote is unique from the main body and is more transparent, resulting in different gray level and color histogram data than the main body. It is these properties that are exploited in order to properly determine corresponding border sections in the banknote boundary map 830.

Banknote Main Body Block Removal 460

Figure 9:
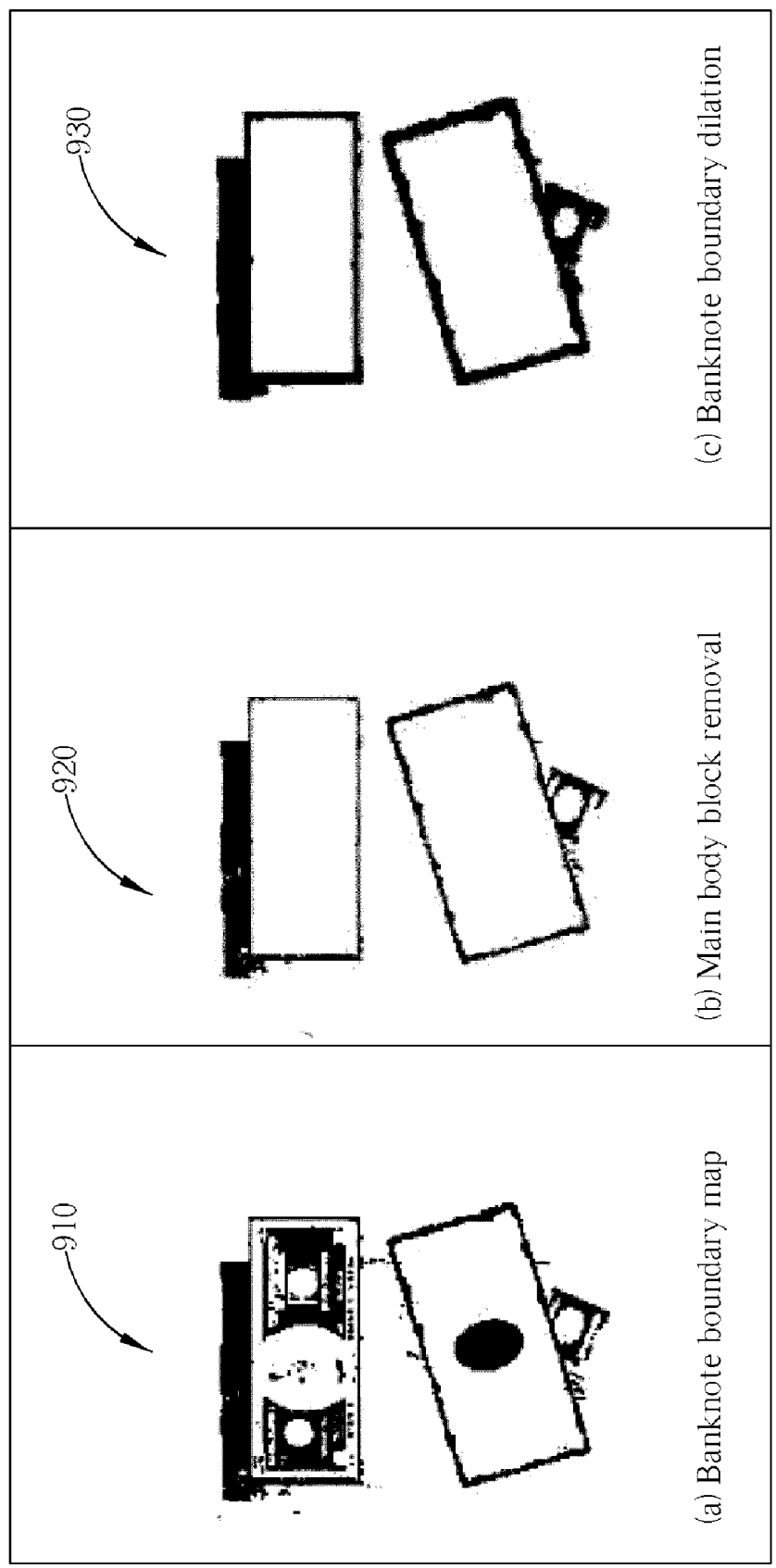
FIG. 9 illustrates removal of internal border sections from border sections of the banknote boundary map, and dilation of the perimeter border sections.

With border sections identified in the banknote boundary map, the next step comprises banknote main body block removal 460. Note from FIG. 8, upon generating the banknote boundary map 830, the border sections comprise internal border sections enclosed by perimeter border sections. The internal border sections exist because, although the predetermined color and gray level ranges are tuned according to a valid banknote boundary, there may also be main body sections within the banknote that also meet the banknote boundary criteria. As the internal border sections are not required, they are removed accordingly. FIG. 9 illustrates this step, showing an original banknote boundary map 910, followed by the removal of internal border sections in 920 resulting in only the perimeter border sections in of the banknote boundary map.

Removal of the internal border sections enclosed by perimeter border sections can be conducted according to a number of criteria. In a preferred embodiment, the method can remove a number of internal border sections according to number of sections being greater than a threshold number. Additional embodiments may utilize removing internal border sections in the banknote boundary map such that the removed internal border sections correspond to a predetermined surface area.

Banknote Boundary Dilation 470

The final step of banknote boundary map generation in this embodiment involves banknote boundary dilation 470. This step is also illustrated in FIG. 9 through banknote boundary dilation 930. This step is included because certain portions of the perimeter border sections may be very thin and not entirely connected by neighboring border sections. This characteristic may make it very difficult to distinguish the border of a certain banknote from surrounding or overlapping ones. Therefore, the perimeter border sections on the banknote boundary map are dilated to provide further clarity and resolution between banknotes.

Although an embodiment for generating the banknote boundary map is discussed above, other embodiments may be equally applicable in achieving the goals of the present invention. Therefore, the exact implementation for discerning the border sections from the original scanned image can vary according to a number of embodiments. Other embodiments may involve comparing color histogram data of image sections of the scanned image to color histogram data corresponding to boundaries of valid monetary banknotes. Another embodiment may involve comparing texture data of the image sections to texture data corresponding to boundaries of valid monetary banknotes. The exact implementation of the banknote boundary map is intermediate, as long as the banknote boundary map suffices in identifying border sections from the image sections corresponding to a boundary of monetary banknotes within the scanned image.

In some embodiments, banknote Boundary Map Generation 120 may further include a binary decision map generation 430 step briefly referred to above in FIG. 4. In this case a color binary decision map indicating probable sections corresponding to the monetary banknotes are generated. Border sections are then recorded onto the banknote boundary map as the probable sections having color histogram data within the predetermined color range and gray levels within the predetermined gray level range. This embodiment therefore adds an extra processing step for more refined verification results. Further details are described below.

Binary Decision Map Generation 430

Figure 10:
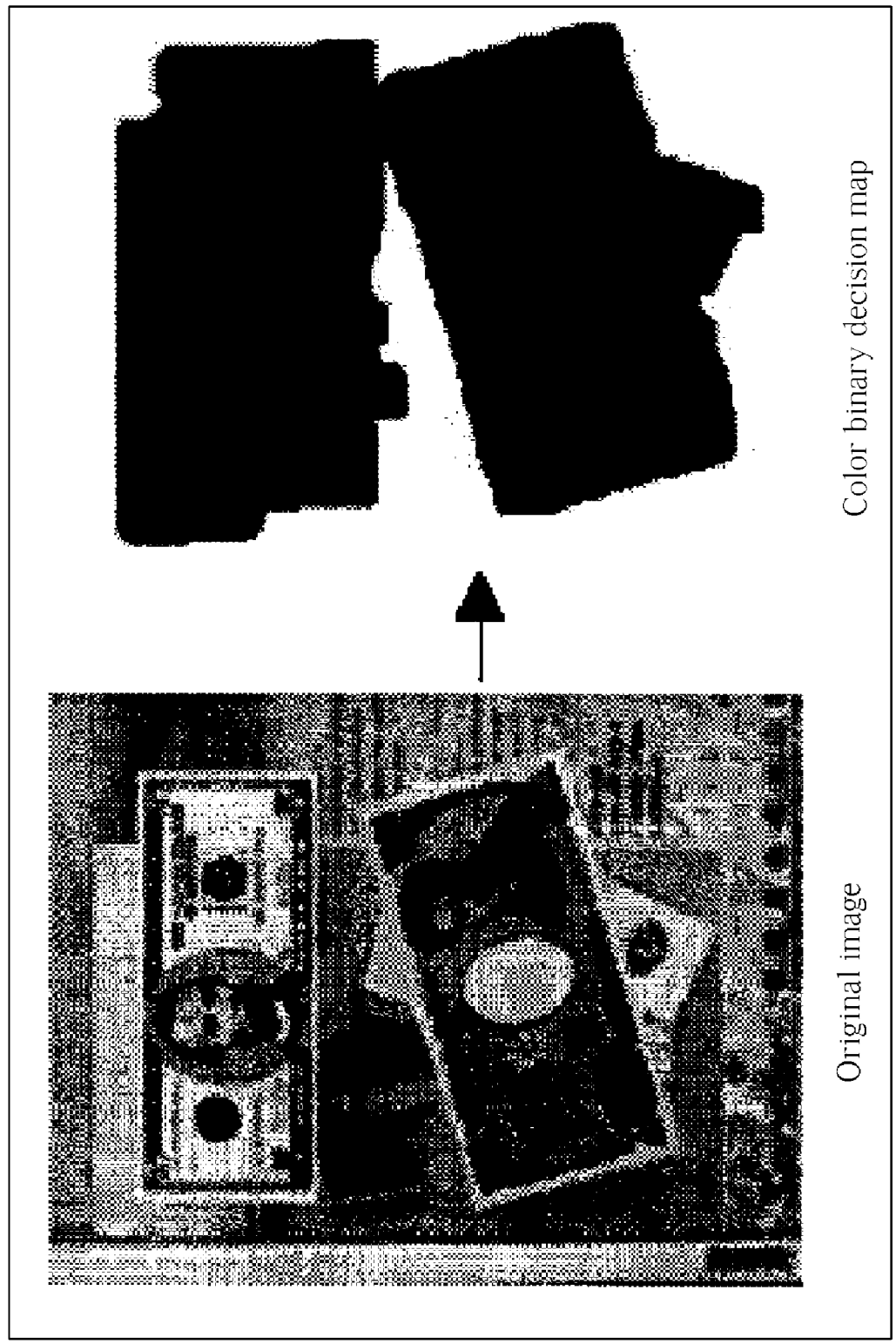
FIG. 10 illustrates the color binary decision map.

Binary decision map generation 430 focuses on generation of the color binary decision map. The color binary decision map indicates probable sections from the sections in the image corresponding to the monetary banknote based on color histogram data. An example of this is shown in FIG. 10. The left hand image of FIG. 10 shows an original image containing a monetary banknote, while the right hand section illustrates the color binary decision map. The probable sections corresponding to the monetary banknote from the image are shown in black. Determination of the probable sections in the color binary decision map is in accordance to a frequency of occurrence of the color histogram data within a valid monetary banknote. For instance, color histogram data is extracted from sections of the image. This histogram data is compared to color histogram data within a valid monetary banknote. Based on a frequency of occurrence within the valid monetary banknote, the section is a probable section if it exceeds a predetermined statistical threshold.

Figure 11:
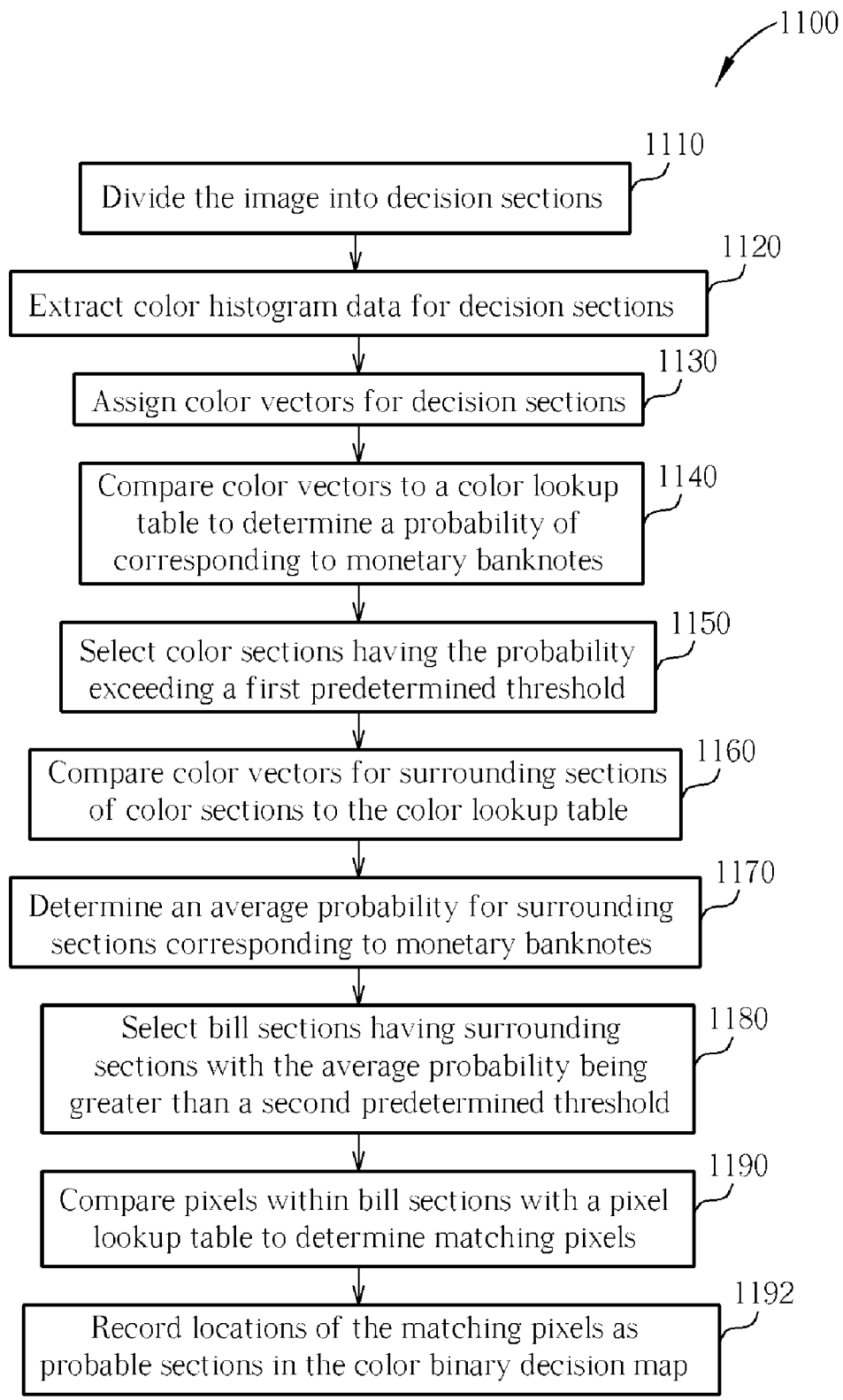
FIG. 11 is a flow chart diagram illustrating binary decision map generation 430 of FIG. 4.

An embodiment describing the method for Binary decision map generation 430 of FIG. 4 is outlined in FIG. 11 through process 1100. Each step of process 1100 is described in the following:

As illustrated in FIG. 11, the first step of Binary decision map generation 430 comprises dividing the scanned image is into a plurality of decision sections 1110, which will each be analyzed. This can be performed in a manner similar to FIG. 2 and FIG. 3 as shown for the verification sections, and therefore does not require further discussion. In certain embodiments, the decision sections may also correspond to the verification sections. Dividing the image into decision sections allows for lower computational costs in determining valid and invalid sections of the image in terms of color characteristics.

Once divided into decision sections, color histogram data is then extracted for each decision section 1120. This step is performed similar to that shown in FIG. 5 and FIG. 6, and is therefore not discussed in any further detail for brevity. The preferred embodiment employs a three dimensional color space, such as an RGB color space, having a first color 510, a second color 520 and a third color 530, from which the median and width values can be extracted for each color. As properties of color histograms are well known to those involved in the related art, further discussion is omitted for brevity.

With color histogram data extracted for each decision section, a color vector can then be constructed for each decision section 1130 according to the extracted data. The color vector provides a convenient representation of color information for each decision section. One embodiment utilizes a six dimensional space vector to summarize key data points extracted from the color histogram of the decision section, described below as:

color vector [width of $1^{st}$ color] [width of $2^{nd}$ color] [width of $3^{rd}$ color] [median of $1^{st}$ color]

[median of $1^{st}$ color–median of $2^{nd}$ color] [median of $1^{st}$ color–median of $3^{rd}$ color]

The use of differences between median values in the $5^{th}$ and $6^{th}$ array is to reduce total memory space constraints. When using RGB histograms, it is noted that the median values are within a local proximity to each other. If required, the median values of the $2^{nd}$ and $3^{rd}$ colors can be extracted from the above when the median of the $1^{st}$ color is known.

After defining color vectors for each decision section, each color vector is then compared to a color lookup table to determine a probability of the decision section corresponding to a valid monetary banknote 1140. The probability that the decision section corresponds to monetary banknotes is calculated according to the frequency of occurrence in the lookup table.

The color lookup table is created by dividing an image of a valid monetary banknote into a number of table sections. As with previous descriptions, the table sections can be isolated, independent, or overlapping according to the specific embodiment of the present invention, and can be similar to that shown in FIG. 2 and FIG. 3, respectively. The configuration of the table sections can also have shift or rotational variations according to a desired training format for the color lookup table, with multiple levels of mapping also possible.

Color histogram data is then extracted for each table section of the valid monetary banknote, with a color vector assigned for each table section of the valid monetary banknote based on the respective color histogram data. A frequency of occurrence is then counted for each assigned color vector of the valid monetary banknote.

If the probability of the decision section corresponding to monetary banknotes exceeds a first predetermined threshold, in step 1150, it is then selected a color section. This step is repeated for all decision sections until their status as a color section has been confirmed. Therefore, at this stage, color sections are merely decision sections having color vectors with an acceptable frequency of occurrence in comparison with a valid monetary banknote.

Surrounding section examination then follows in 1160. The surrounding section examination is a more global approach from the previous steps. Using the probability information from the decision section examination in 1140, probabilities of surrounding sections of each color section are examined.

First, a comparison of color vectors for surrounding sections to each color section is performed in 1160, with reference to the color lookup table. An average probability for the surrounding sections corresponding to monetary banknotes is then determined. Similar to the previous step, an average probability for surrounding sections corresponding to monetary banknotes is calculated according to the frequency of occurrence of the surrounding section color vectors in the lookup table in step 1170. If the average probability is greater than a second predetermined threshold, in step 1180, then the corresponding probable section is selected as a bill section for use in the next step.

Figure 12:
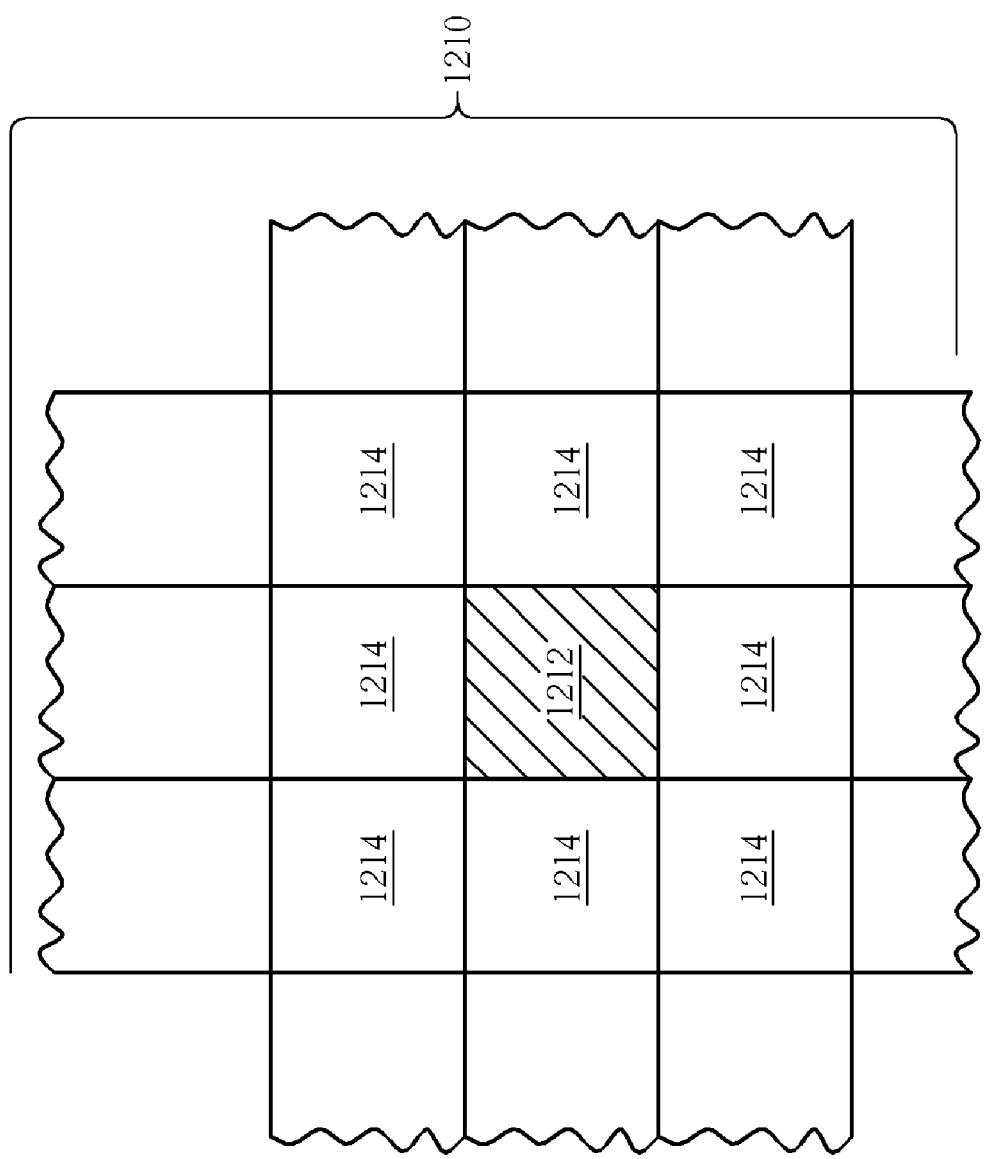
FIG. 12 is an embodiment for illustrating surrounding sections about a color section.

FIG. 12 is used to provide an illustrative example for this step. In this embodiment, the color section is identified as the center section 1212. Surrounding sections 1214 encompass the color section 1212. The color vectors identified for the surrounding sections 1214 are compared against the color lookup table to determine an average probability of the surrounding sections corresponding to monetary banknotes. If the average probability is greater than the second predetermined threshold, then the color section 1212 is selected as a bill section.

Although FIG. 12 illustrates the surrounding sections 1214 forming a circumference outside of the color section 1212, variations and alternate embodiments may illustrate different configurations, which still obey the teachings of the present invention. For example, the surrounding sections can be arranged in an overlapping, rotational, disjoint, offset, or shifted manner. In all such cases, the present invention method is equally applicable to maintain its desired functional goals.

Once bill sections are determined in step 1180, a pixel level approach is implemented to examine pixels within each bill section. This is performed in the pixel level examination of step 1190. The main purpose of this step is to check whether most of the pixels come from the same type of banknote. Pixels contained within the bill sections are compared with a pixel lookup table to determine matching pixels. Matching pixels are defined according to the frequency of occurrence of the color histogram data of the pixels in the pixel lookup table. If matching pixels are discovered within a bill section, the method 1100 acts to record the location of the matching pixels on the color binary decision map in step 1192 as probable sections corresponding to the monetary banknote. Therefore, the general color binary decision map is generated.

Regarding the pixel lookup table, it is similar to the color lookup table as it is created by extracting color histogram data for pixels of a valid monetary banknote. A frequency of occurrence for different values of color histogram data for pixels of the valid monetary banknote is then counted. It is this frequency of occurrences, along with the color histogram data of relevant pixels, which is used to determine a matching pixel.

Figure 13:
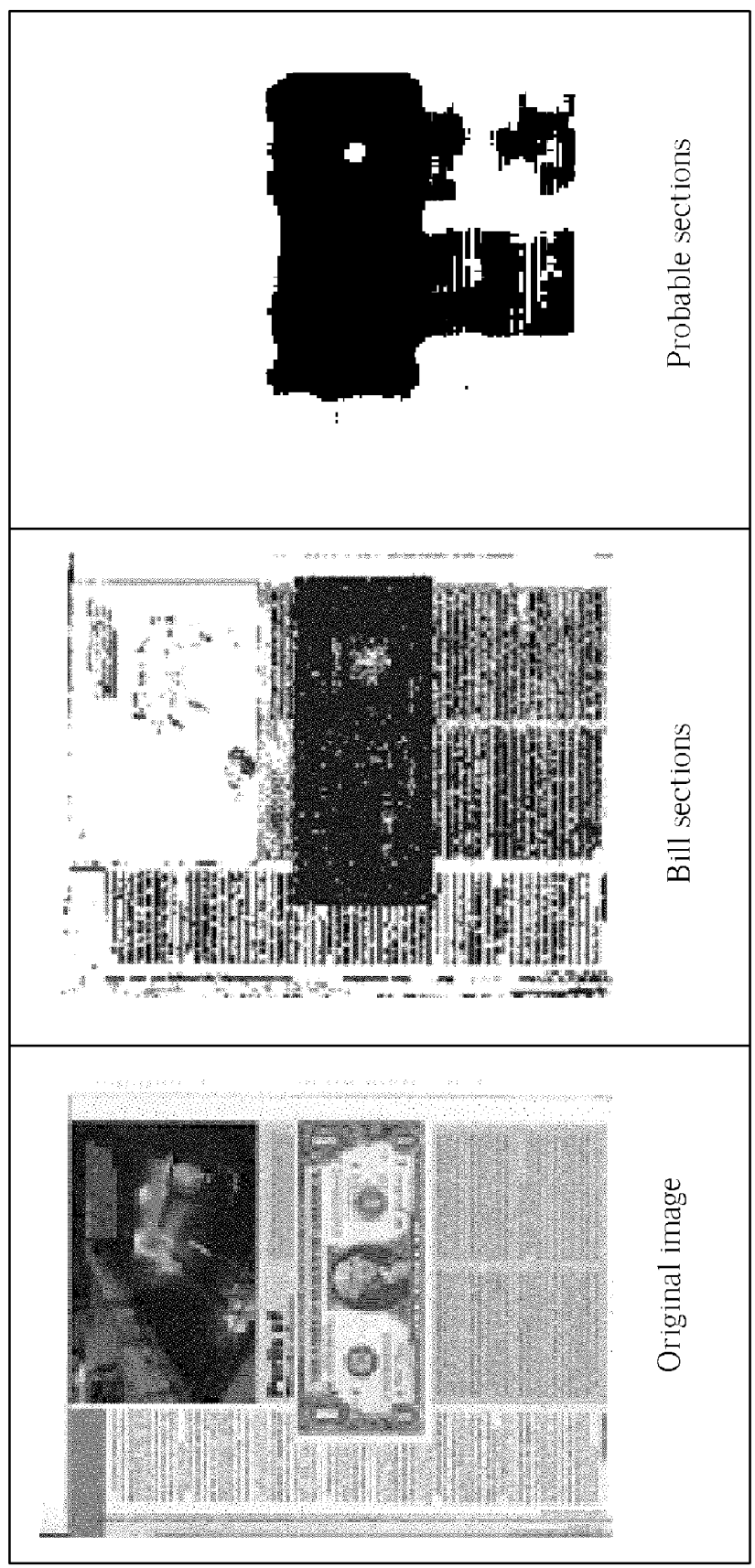
FIG. 13 is an exemplary illustration showing results various ous stages of binary decision map generation.

Although the color binary decision map (step 430, FIG. 4) has been generated through the description above, it is roughly tuned due to uncertainties in image quality, background discrepancies, and noise effects. An example of this is illustrated through FIG. 13. FIG. 13 is an exemplary illustration showing results various stages of binary decision map generation. The left hand image is an original image containing a monetary banknote. The center image shows the output after the bill sections have been determined (where the surrounding sections have been examined for color identification). The right hand image shows the probable sections, where matching pixels are identified in the color process map.

As the right hand image of FIG. 13 shows, although the general area corresponding to the monetary banknote is identified, a considerable amount of noise and background irregularities have been identified as well. Also, there may be holes in bill region and background noise around the bill. Therefore, additional embodiments may include further refinements to the binary color decision map.

Figure 14:
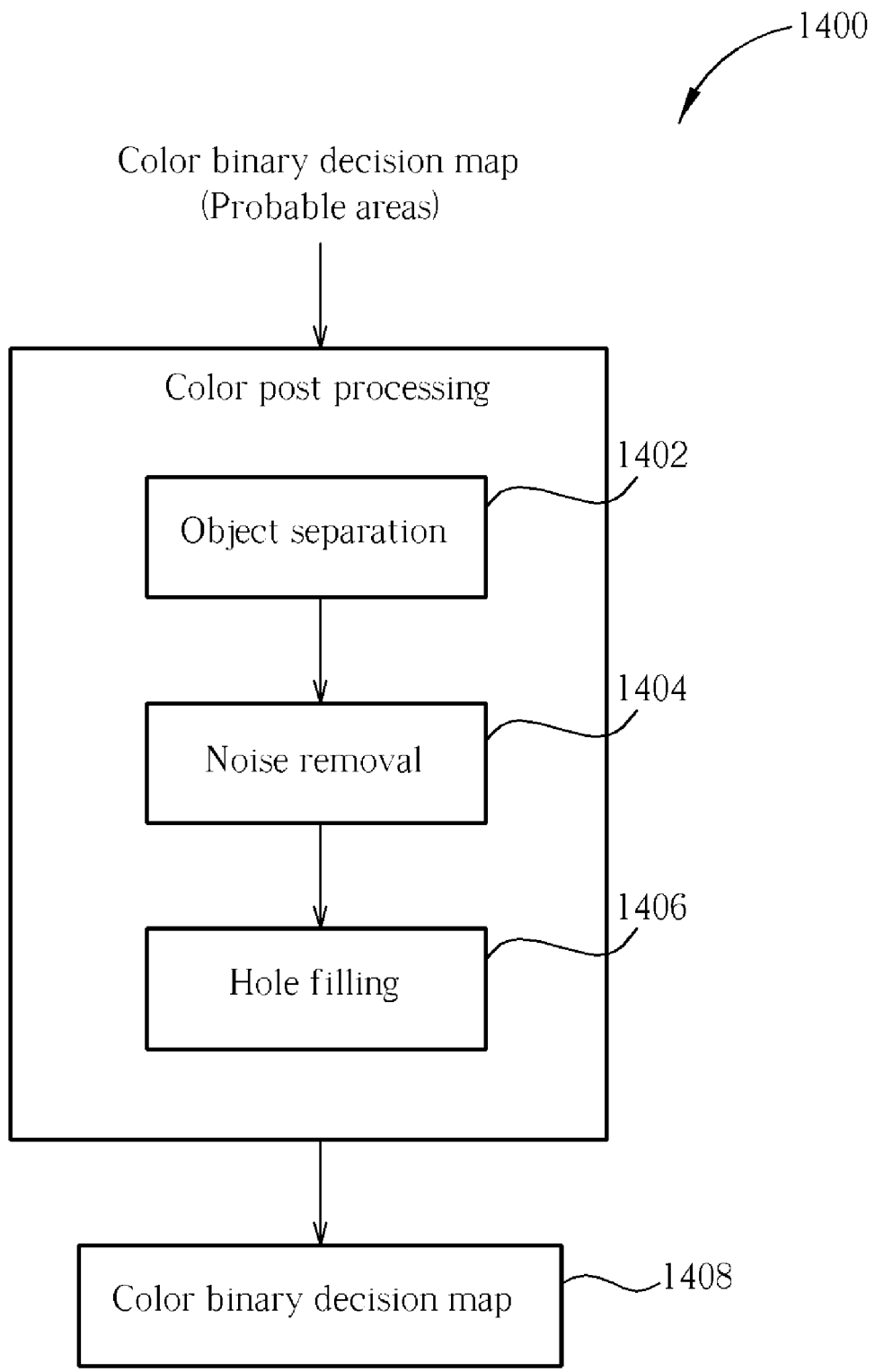
FIG. 14 is an exemplary embodiment illustrating color post processing performed on the color binary decision map.

In order to further "clean up" the background effects and noise that may be associated with the color binary decision map, a further level of color post processing 1400 can additionally be applied. This step is illustrated in FIG. 14. As shown in FIG. 14, color post processing 1400 comprises object separation 1402, noise removal 1404, and hole filling 1406. Different permutations or order of utilization of these steps may additionally be used throughout different embodiments of the present invention, as long as they do not alter the goals or teachings of the present invention.

All three of these sub steps will be further clarified below.

Object Separation 1402

The first described step of color post processing 1400 involves object separation 1402. This is performed in order to condition the color process map. Objects are separated using a flood filling algorithm. Although there are many different flood-fill algorithms, one preferred embodiment uses a basic 8-neighbor flood-fill algorithm with 3 iterations. However other embodiments may use other algorithms, bearing that the goals and teachings of the present invention are maintained.

Figure 15:
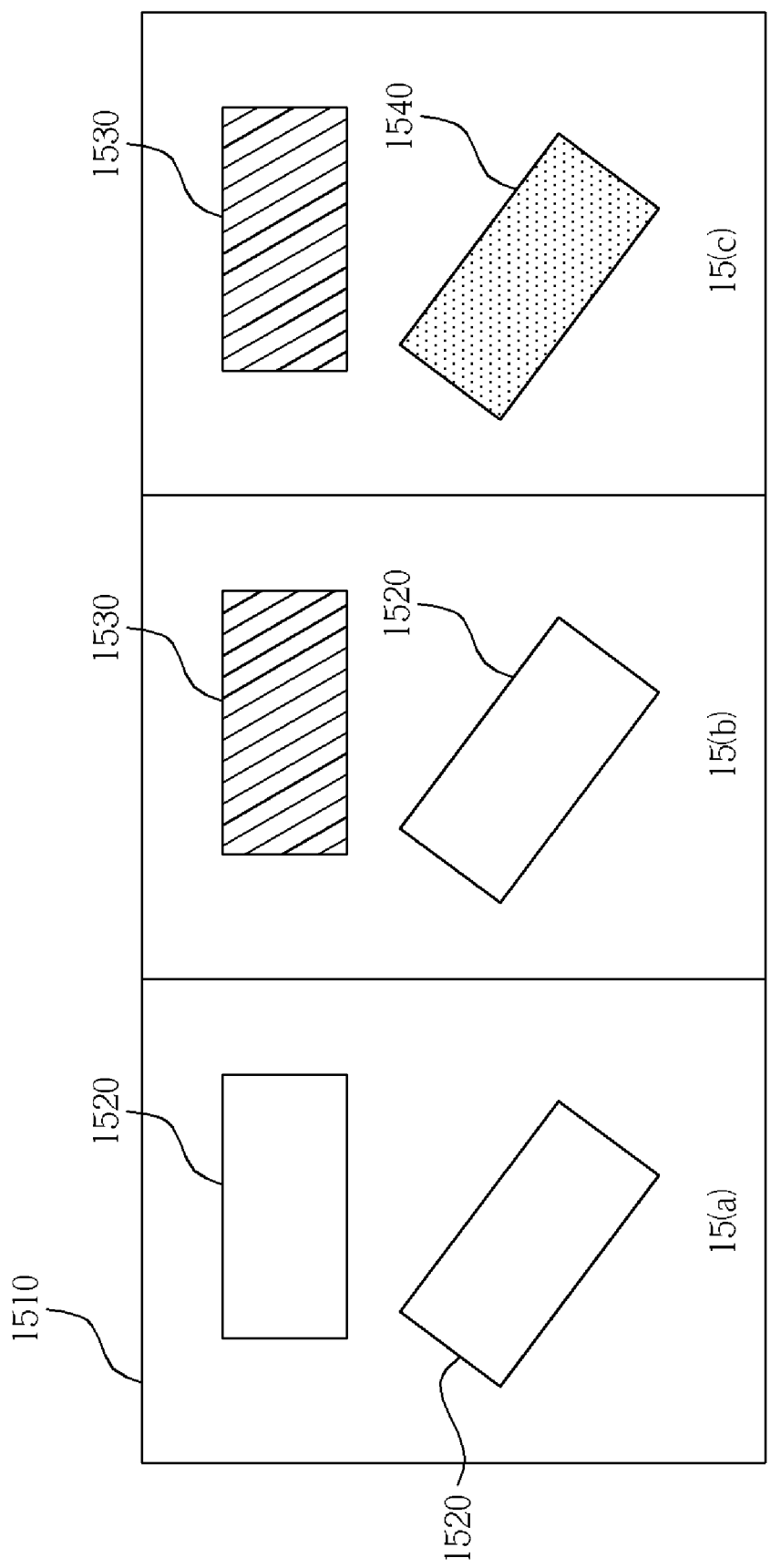
FIG. 15 is an exemplary embodiment illustrating object separation 1402 performed in color post processing.

An object separation algorithm is first used to label each isolated object in the color binary decision map. This is illustrated with reference to FIG. 15, showing various stages of the object separation algorithm. Initially, the background is labeled with a first label value 1510, as shown in 15 (*a*). An image scan is then performed, in both vertical and horizontal directions. If a block is met (probable area) during the image scan, it is labeled with a second label value 1520. As shown in 15 (*a*), two objects are encountered in this step, both being labeled with the second label value 1520. Image scanning then continues, however this time, when each object with a second label value 1520 is encountered, it is flood filled and then labeled with a new label value. As shown in 15 (*b*), the top object having a second label value has been encountered, and re-labeled with a third label value 1530. Each encountered object having a second label value is thus flood filled and re-labeled with an incrementing label value (fourth, fifth . . . etc . . . ) until there are no more remaining objects with the second label value 1520. In FIG. 15 (*c*), the bottom object with the second label value has been encountered, and thus re-labeled with the fourth label value 1540. When completed, each different object, along with the background, is labeled with a different label value. As illustrated in FIG. 15, there are two identified objects (third label value 1530, fourth label value 1540) along with the background (first label value 1510).

Noise Removal 1404

Noise removal 1404 is used to remove noises according to the region area criterion. This step is then performed to reduce background noises surrounding probable areas. As noise removal algorithms are commonly known by those within the art, further discussion will be omitted for brevity.

Hole Filling 1406

Figure 16:
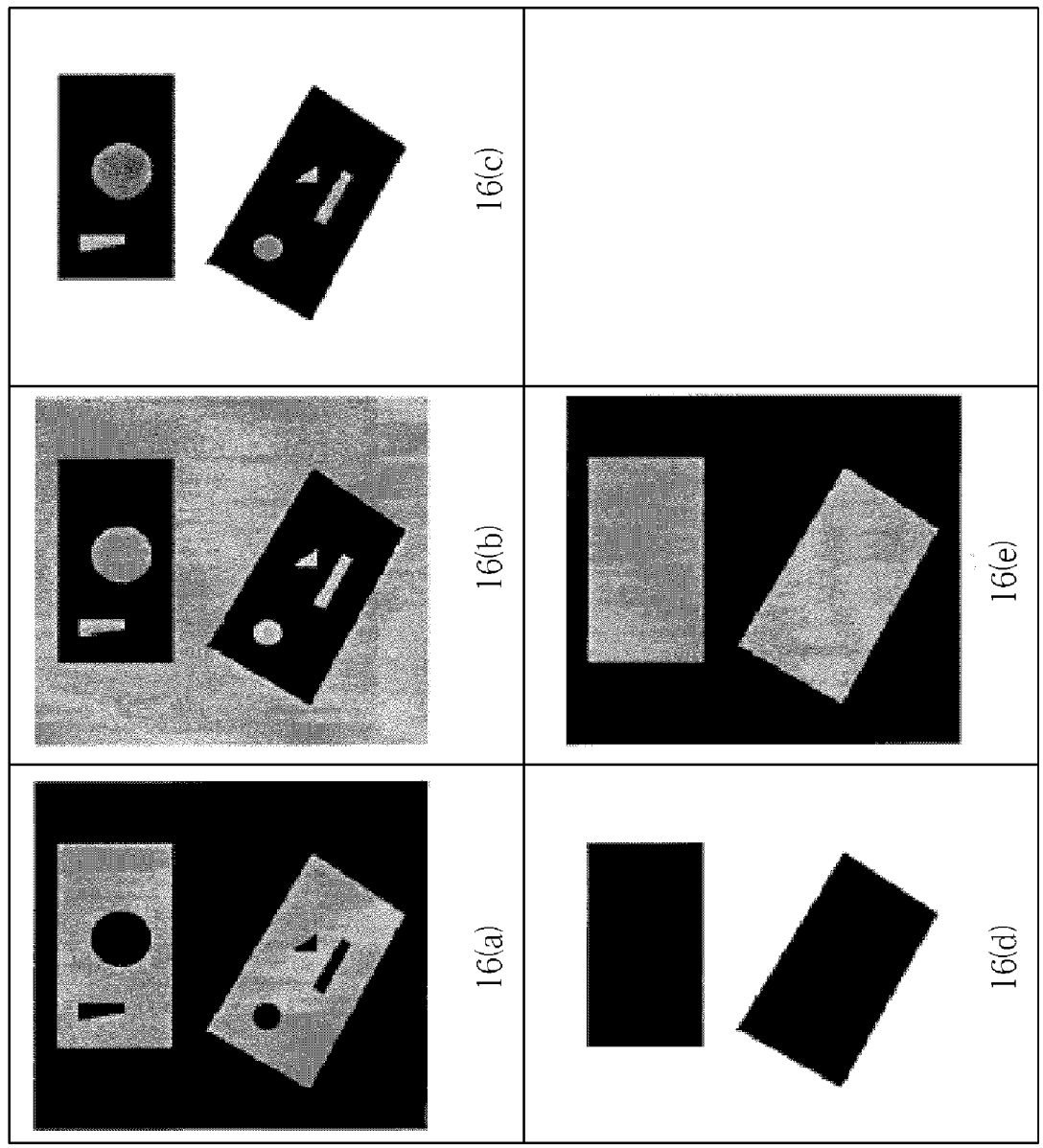
FIG. 16 is an exemplary embodiment illustrating hole filling 1406 performed on enclosed objects.

Hole filling 1406 can then be performed following noise removal 1404. A hole-filling algorithm is applied to improve the color binary decision map by ensuring enclosed objects are uniform in value. The hole-filling algorithm is used in conjunction with the flood-filling algorithm, such as that described in object separation 1402. Hole filling 1406 is illustrated in FIG. 16. From the binary decision map, probable areas and non-probable areas (background or hole objects) are labeled as a first hole label and a second hole label (identified by gray and black colors) respectively, as shown in FIG. 16(*a*). Then, the hole labels of probable areas and non-probable areas are flipped (ie, black becomes gray, and gray becomes black) as in FIG. 16(*b*). The background is then labeled with a third hole label using a flood fill algorithm (indicated by the white color in FIG. 16(*c*)). The first hole labels, now corresponding to the holes within the probable areas, are then changed to the second hole labels, as shown in FIG. 16(*d*) to match the probable areas. In this way, the holes are filled. Finally, the second hole labels are changed back to the first hole labels (black to gray) to identify probable areas, and the third hole labels are changed to the second hole labels (white to black) as illustrated in FIG. 16(*e*).

Therefore, a combination of both flood filling and hole filling is used in order to further refine the color binary decision map and to accurately identify and separate objects, which may correspond to the monetary banknotes.

Figure 17:
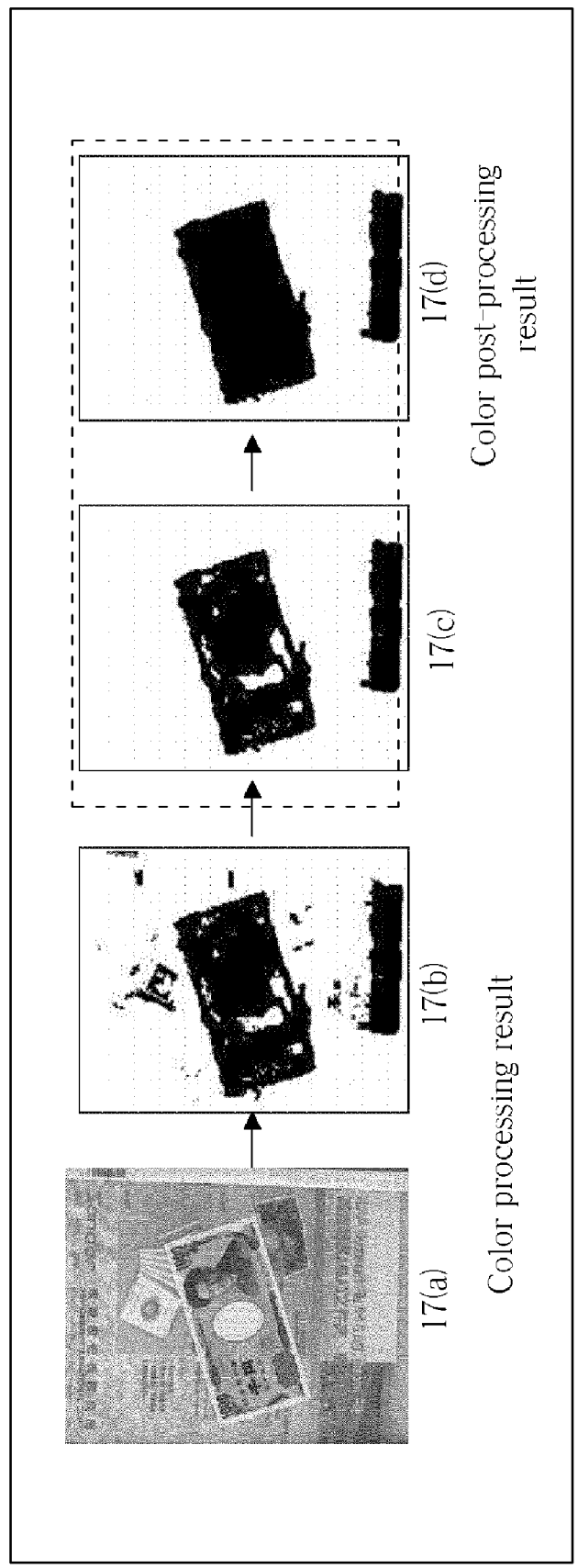
FIG. 17 illustrates stages of color processing during generation of the color binary decision map.

FIG. 17 illustrates various stages of color processing during generation of the color binary decision map. The original image in 17 (*a*) includes the monetary banknote to be detected, imposed onto a background image. Upon initially generating the color binary decision map (according to FIG. 11), the probable sections corresponding to the monetary banknote is roughly identified in 17 (*b*). However there appears to be excess noise from the background image, as well as holes within certain areas of the banknote. Color post processing 1400 can then applied to further clarify the color binary decision map, including object separation 1402 in 17(*c*), and hole filling 1406 in 17(*d*). The result produces a more refined color binary decision map to clearly define probable sections corresponding to the monetary banknote.

Texture Decision Map Generation 130

Texture decision map generation 130 of FIG. 1 produces a binary texture decision map based on the scanned image divided into feature sections. Texture values for each feature section of the scanned image are first determined, then compared to texture values of a valid monetary banknote. Texture sections are then selected from the feature sections if they have texture values within a valid range of a valid monetary banknote.

Figure 18:
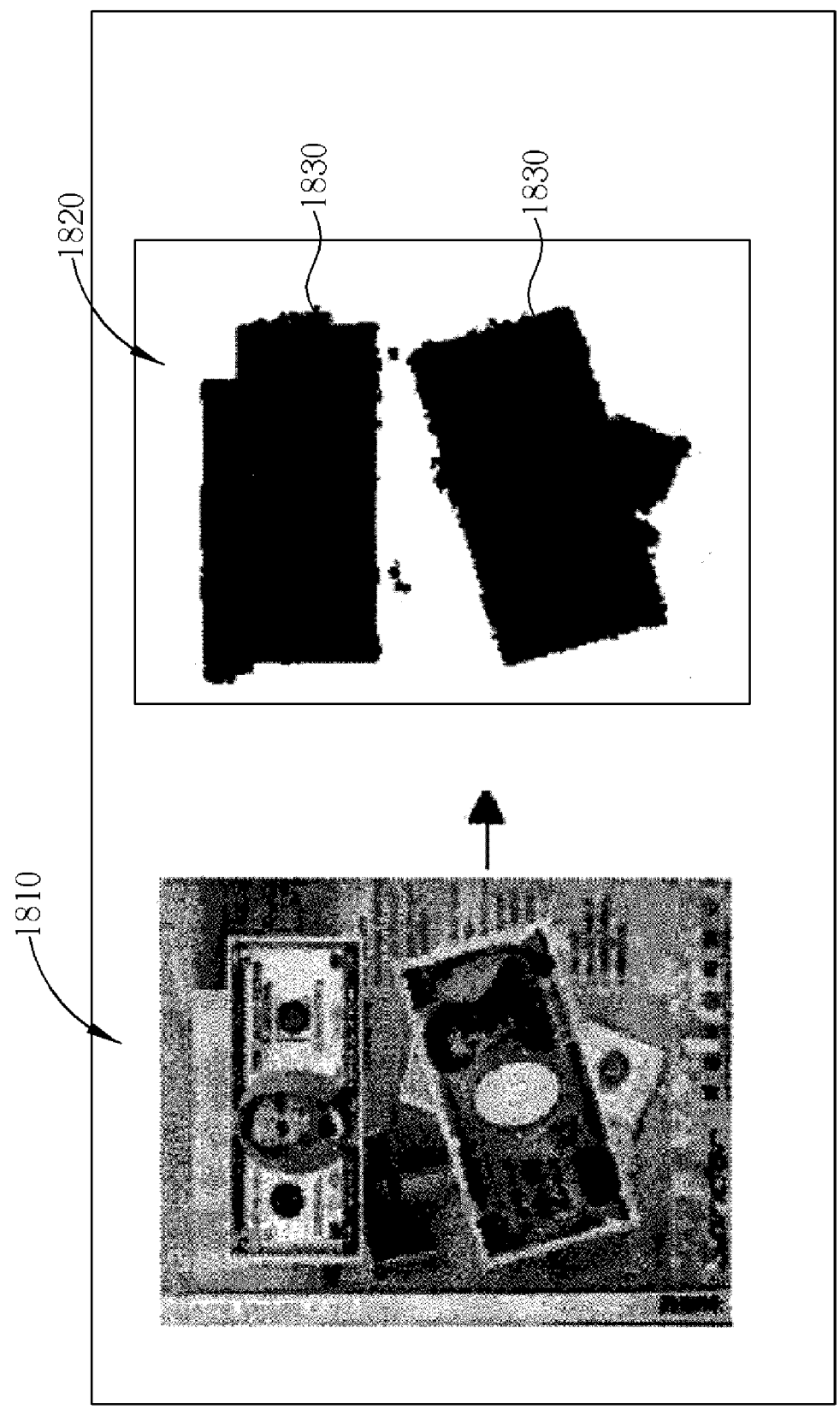
FIG. 18 exemplary diagram of the texture decision map.

FIG. 18 illustrates an exemplary diagram of the texture decision map 1820 generated from a scanned image 1810. Upon performing the general process described above, texture sections 1830 are identified accordingly from the image sections of the scanned image 1810. As described above, the texture sections are feature sections having texture values with a valid range according to the valid monetary banknote.

The texture values utilized in discerning the texture sections 1830 can vary according to a number of embodiments. One embodiment may involve utilizing gray levels as the texture value, and comparing gray levels of feature sections to gray levels of a valid monetary banknote to determine the texture sections. Other embodiments may use different texture values, such as contrast levels, halftone levels, and edge frequencies. The exact type of texture value utilized is in fact intermediate, as long as the texture decision map 1820 suffices in identifying texture sections 1830 from the feature sections having texture values within a valid range according to the valid monetary banknote.

Figure 19:
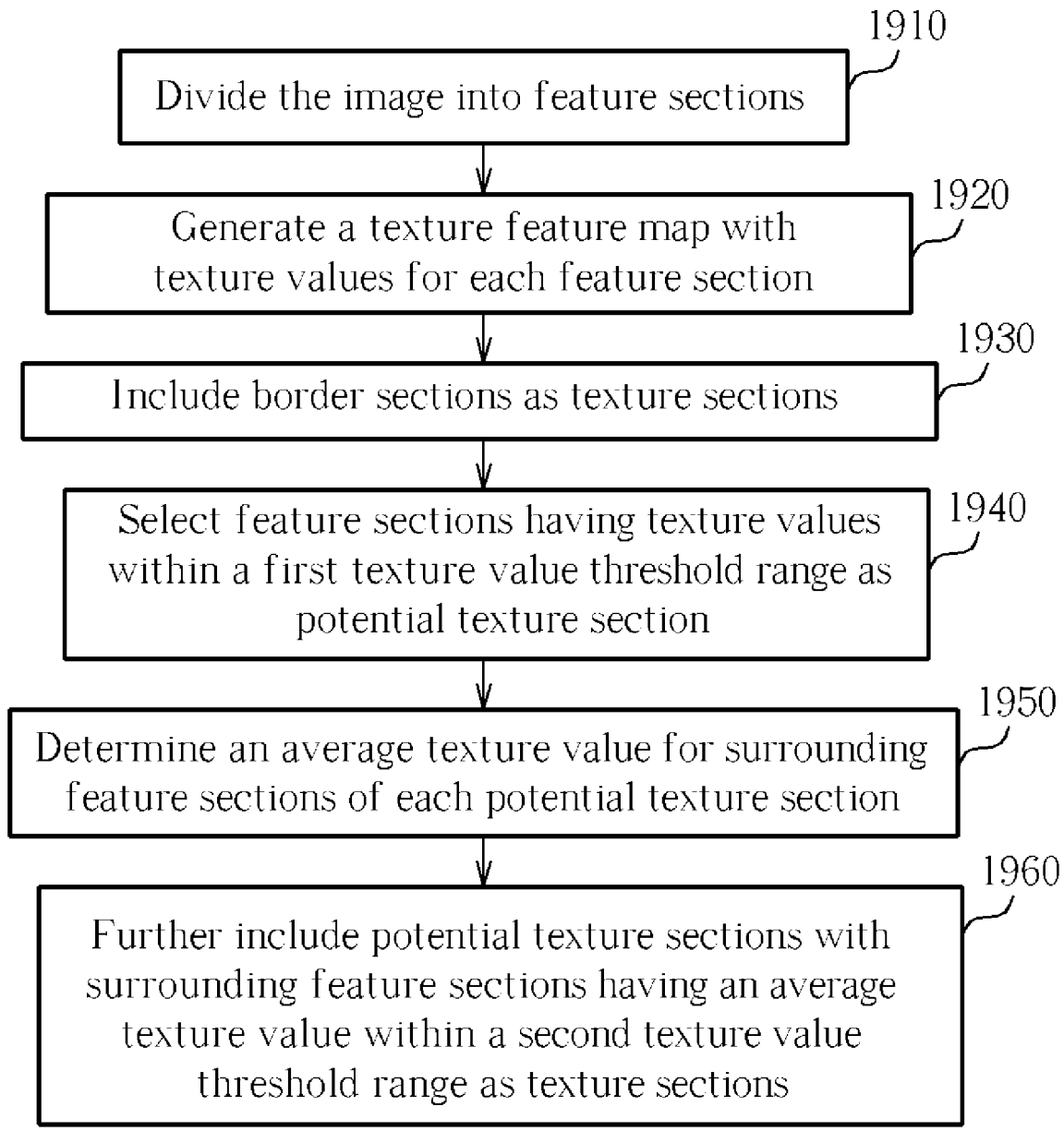
FIG. 19 illustrates a process flow chart for generating the texture decision map according an embodiment of the present invention.

Generation of the texture decision map 1820 is now discussed in the following with reference to FIG. 19. FIG. 19 illustrates an embodiment for generating the texture decision map 1820 according to the present invention. In a first step (1910), the image is divided into feature sections. This can be performed in a manner similar to FIG. 2 and FIG. 3 as shown for the verification sections, and therefore does not require further discussion. In certain embodiments, the feature sections may also correspond to the verification sections, or may also be configured in an overlapping manner.

Upon dividing the image into feature sections, a texture feature map having texture values for each feature section is generated in step 1920. The texture feature map is generated from the original scanned image, and can comprise many types including: a gray level map having grey level values, a halftone map having halftone values, or a binary edge map having edge values. Additional embodiments may contain different types of texture feature maps, however, the above listed examples will be described later in further detail for use in conjunction with the present invention.

In step 1930, border sections are included as texture sections. This step is included because border sections determined in banknote boundary generation 120 obviously correspond to the monetary banknote. Including the border sections as texture sections reduces some of the processing otherwise needed to determine this.

In step 1940, feature sections having texture values within a first texture value threshold range are then selected as potential texture sections. This is a preliminary step to temporarily identify feature sections that have valid texture values when compared to a valid monetary bill. The first texture value threshold range therefore corresponds to a valid texture value range of a valid monetary bill.

In step 1950, an average texture value for surrounding feature sections of each potential texture section is determined. This is because valid texture sections should have valid surrounding sections as well. An example of surrounding sections can also be drawn from FIG. 12. Using this figure as an example, section 1212 can represent the potential texture section, while sections 1214 can represent the surrounding feature sections of 1212. Alternate embodiments however, may illustrate different configurations, which still obey the teachings of the present invention. For example, the surrounding sections can be arranged in an overlapping, rotational, disjoint, offset, or shifted manner. In all such cases, the present invention method is equally applicable to maintain its desired functional goals. Therefore, the texture values for sections 1214 are calculated to determine an average texture value for the surrounding feature sections. The texture values, therefore, are calculated to determine an average texture value for the surrounding feature sections.

Finally, in step 1960, potential texture sections that do have surrounding feature sections with the average texture value within a second texture value threshold range are included as texture sections. The second texture value threshold range additionally corresponds to valid texture values of a valid monetary banknote. This step is a more global approach used to ensure uniformity in texture values around texture sections.

As discussed above, a gray level map can be used as the texture feature map, as it has gray level values for the texture values of each feature section. In this embodiment, the first texture value threshold range corresponds to a gray level of the valid monetary bill, while the second texture value threshold range also corresponds to a gray level of the valid monetary bill.

Figure 20:
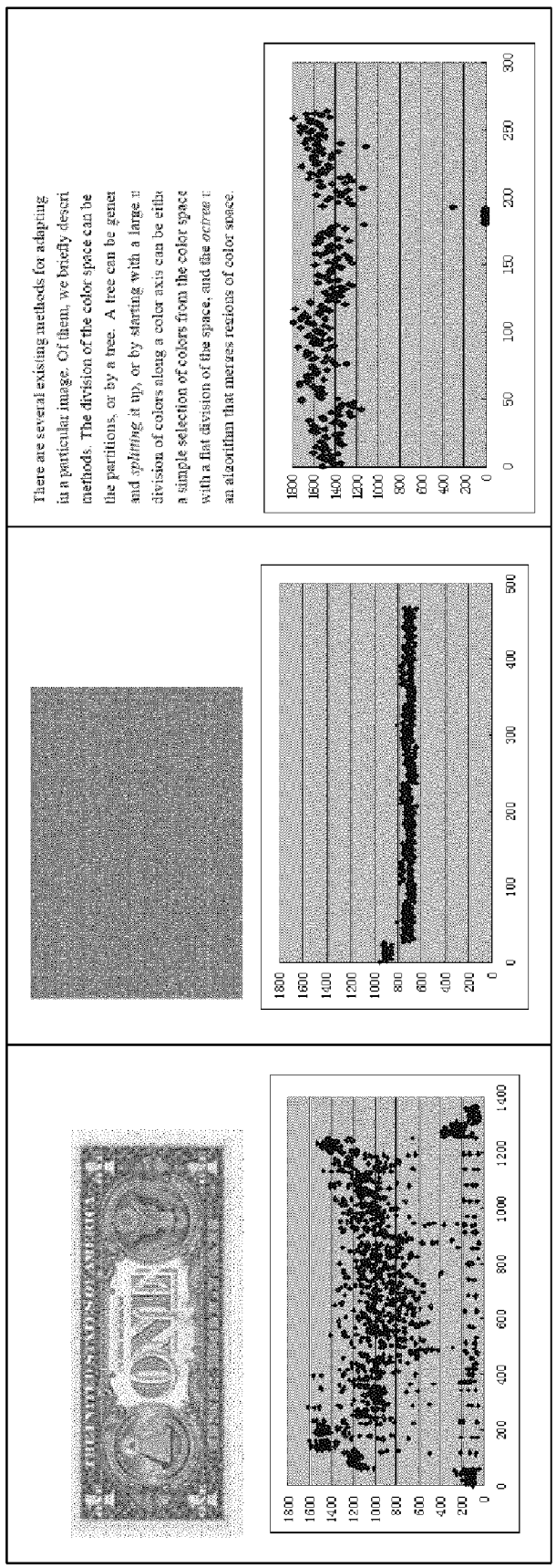
FIG. 20 is an example illustrating gray level variances for various objects.

It is understood that monetary banknotes have a gray level variance within a specific predetermined range, and hence gray level characterization can be used as texture values. FIG. 20 is an example illustrating gray level variance charts for various objects. FIG. 20(a) shows the range of gray level values for a US denomination banknote, while FIG. 20(b) shows the gray levels corresponding to a piece of fabric, and FIG. 20(c) illustrates the gray level values for black on white text. As the examples in FIG. 20 illustrates, every item tends to have a specific range of gray level variance. The fabric shown in FIG. 20(b) tends to have less variance as it has a more uniform grayscale distribution. The black on white text in FIG. 20(c) has a greater variance due to alternating dark text areas, and the white background. The monetary banknote in FIG. 20(a) has the widest grayscale range among the three objects due to the different shades of gray inherent in the banknote. It is this characteristic that is exploited, as the first and second texture value threshold ranges are selected to correspond to the valid gray levels from a valid monetary bill.

Also as described, a halftone map can be used as a texture feature map, as halftone values of the halftone map can be the texture values for each feature section. In this embodiment, the first and second texture value threshold ranges correspond to halftone values of a valid monetary bill. Halftone maps distinguish halftone patterns or values, which can reveal feature sections having a predefined color range, and a predefined continuous color gradient range.

Figure 21:
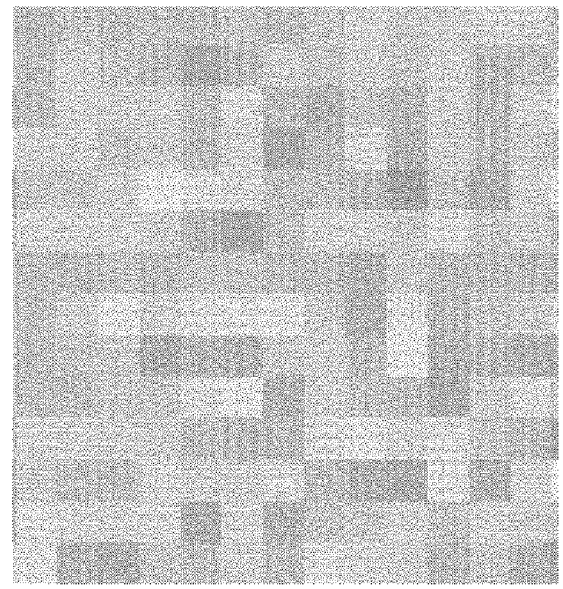
FIG. 21 is an example illustrating an image using halftone mode printing and typical bill printing.
Figure 21:
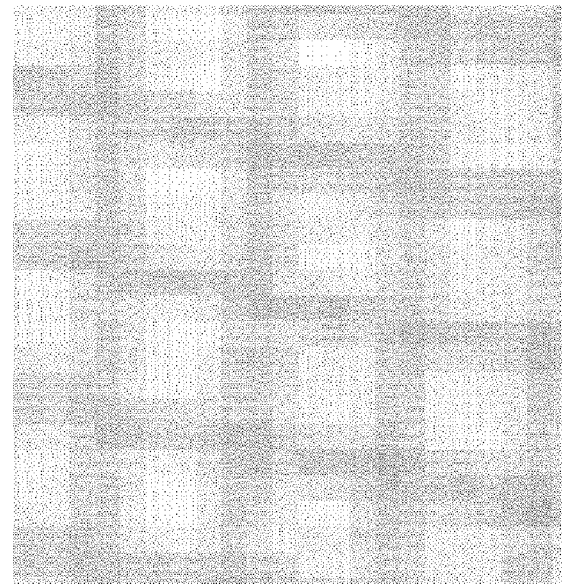

Put more specifically, halftone patterns can be defined as those with few or no neighbors in the same range of color hue (U,V) in YUV space, or (Cb,Cr) in YCbCr space. This is also known has halftone mode printing. FIG. 21 is an example illustrating an image using halftone mode printing (FIG. 21(b)) and typical bill printing (FIG. 21(a)). The bill printed image in FIG. 21(a) shows a more continuous color gradient in a straight line, as any given pixel has surrounding pixels with the same or similar color tones. The halftone mode image in FIG. 21(b) appears more disjoint, and has a greater variance in color and color continuity. Pixels in halftone images do not generally have surrounding pixels with similar color tones, and therefore do not have a continuous color gradient. In this step, feature sections that are printed in the halftone mode are omitted from further process steps, as they do not correspond to monetary banknotes. The feature sections having halftone values corresponding to a desired monetary banknote, and also having surrounding sections corresponding to a desired monetary banknote are then selected as texture sections in the texture decision map for further processing.

Finally, a binary edge map can represent the texture feature map, as it has edge values as the texture values for each feature section.

Figure 23:
FIG. 23 illustrates another embodiment of the binary edge map.

A binary edge map is generally a two level (or two tone) representation based on the gray level gradient of the scanned image. In certain embodiments, it is the gradient in a 3×3 gray block (in YUV domain, using Y channel). Construction of the binary edge map is performed by assigning pixels within feature sections one of two values. More precisely, gray level gradients of pixels within feature sections are compared to a predetermined threshold level. If the gray level gradient of the pixel is greater than the predetermined threshold, it is assigned a first value. If the gray level gradient of the pixel is lower than the predetermined threshold, it is assigned the second value. Values for all pixels are assigned and subsequently mapped onto a binary edge map. FIG. 22 illustrates an exemplary embodiment of the binary edge map. A 10×10 feature section is shown, containing 100 total pixels. In this example, if the gray level gradient of the pixel surpasses the predetermined threshold, it is assigned a "1" value. Otherwise, it is assigned a "0". FIG. 23 shows another embodiment of the binary edge map, where a Sobel filter is applied. The first value takes a black tone and the second value is white, allowing for a more visual or graphical representation of the binary edge map. As shown in FIG. 23, the banknote is very prominent when compared against the background.

With the binary edge map providing a two value representation of the scanned image, edge values can be determined for each feature section. As the texture of banknotes tend to be very fine, one way to characterize it is to determine the number of edges when traversing the binary edge map. Edge values therefore utilize section based zero-crossing frequencies to determine the texture value. In other words, when traversing a feature section in the binary edge map, frequency of transitions from a first value to a second (or a second value to a first) are counted. To get a higher resolution for the texture value, a total of four different frequencies in four directions are attained: a first frequency of alternating of values in a first direction of the binary edge map, a second frequency in a second direction, a third frequency in a third direction, and a fourth frequency in a fourth direction. The edge value for a feature section is therefore determined according to these four frequencies in different directions.

Figure 24:
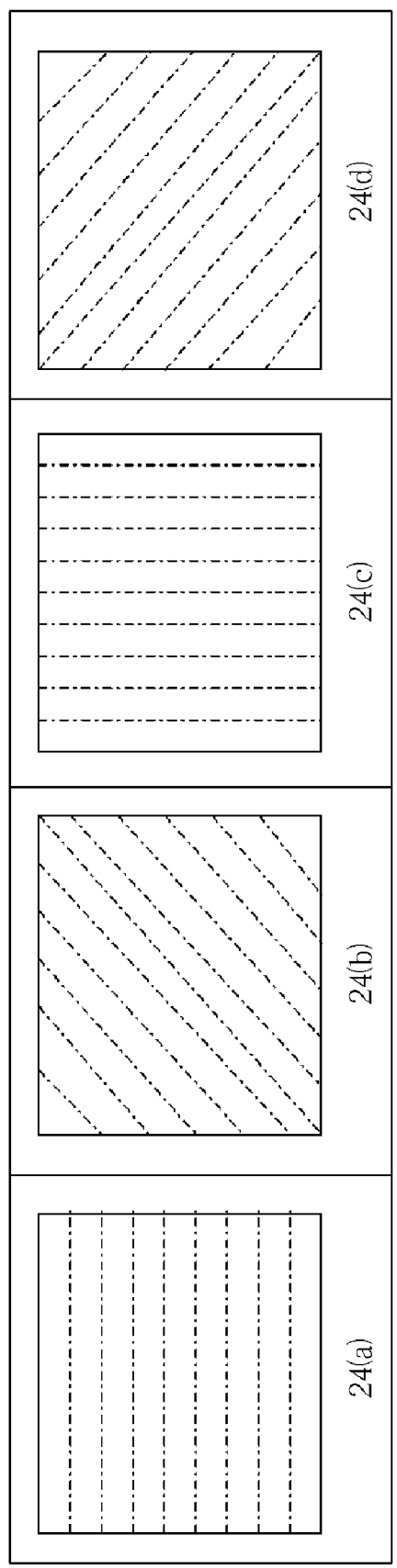
FIG. 24 is an exemplary illustration of traversing feature sections of the binary edge map.

FIG. 24 shows an exemplary illustration of traversing feature sections of the binary edge map to determine the first, second, third, and fourth frequencies of alternating values, each in different direction. In FIG. 24(a) the first direction is shown at 0 degrees, in 24(b) the second direction is shown at 45 degrees, in 24(c) the third direction is shown at 90 degrees, and in 24(d) it is shown at 135 degrees. Upon obtaining the first, second, third, and fourth frequencies, the texture value can be calculated accordingly for each feature section. In a preferred embodiment of the invention, the edge value is calculated according to a maximum frequency, a minimum frequency, and a difference between the maximum frequency and the minimum frequency for each of the first frequency, the second frequency, the third frequency, and the fourth frequency.

Object Determination 140

Having both a banknote boundary map from 120, and texture decision map from 130, object determination 140 can now be resolved. The goal of object determination 140 is to distinguish a number of objects within the scanned image, any of which can potentially be a monetary banknote. In order to accomplish this, overlapping regions in the texture decision map must have individual objects separated from each other. This is accomplished by removing texture sections in the texture decision map that correspond to the border sections in the banknote boundary map. Because the border sections in the banknote boundary map outline the banknotes, it can be used to separate individual banknote regions in the texture decision map.

Figure 25:
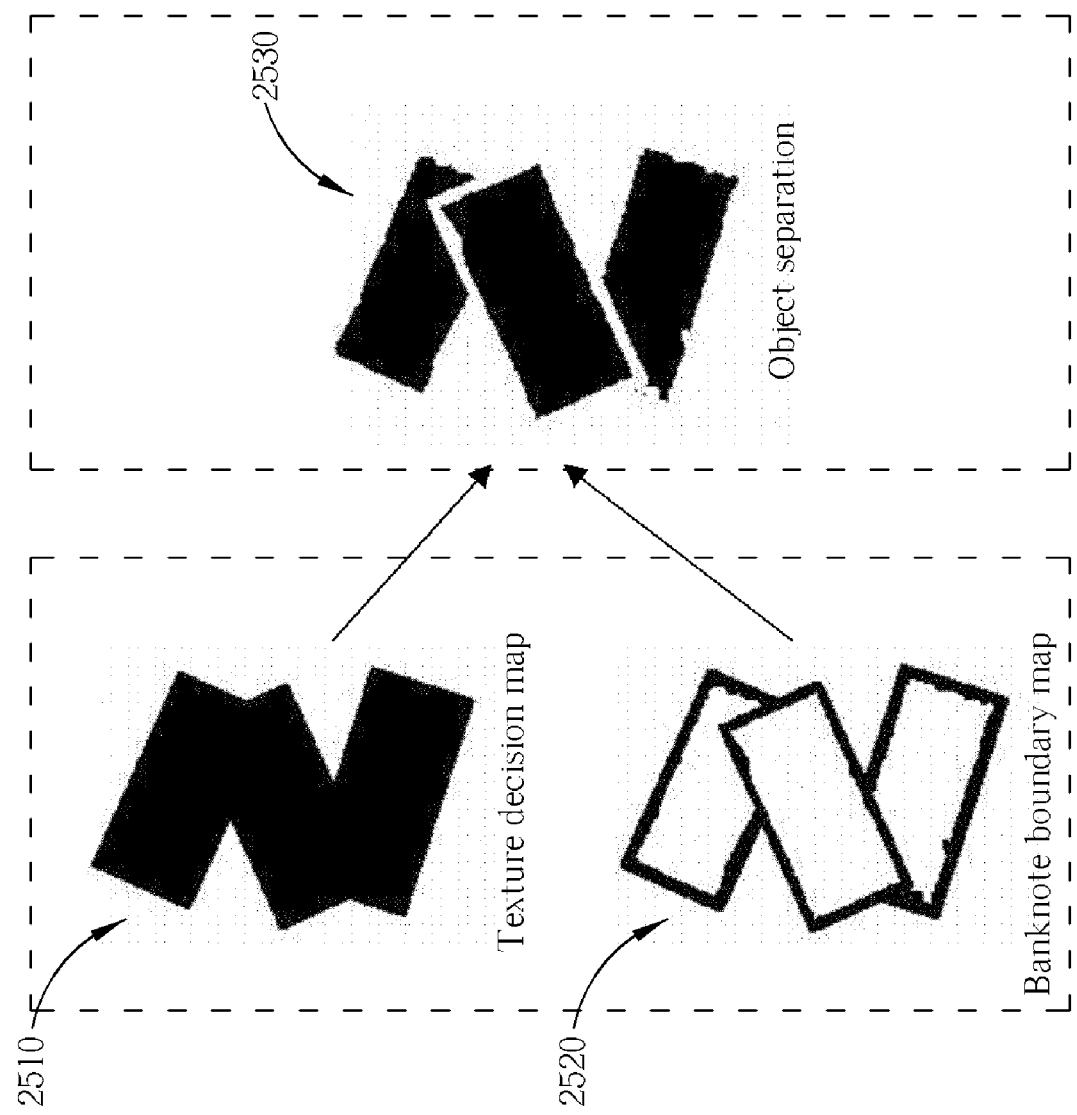
FIG. 25 is an exemplary embodiment illustrating the object determination step 140 of FIG. 1.
Figure 26:
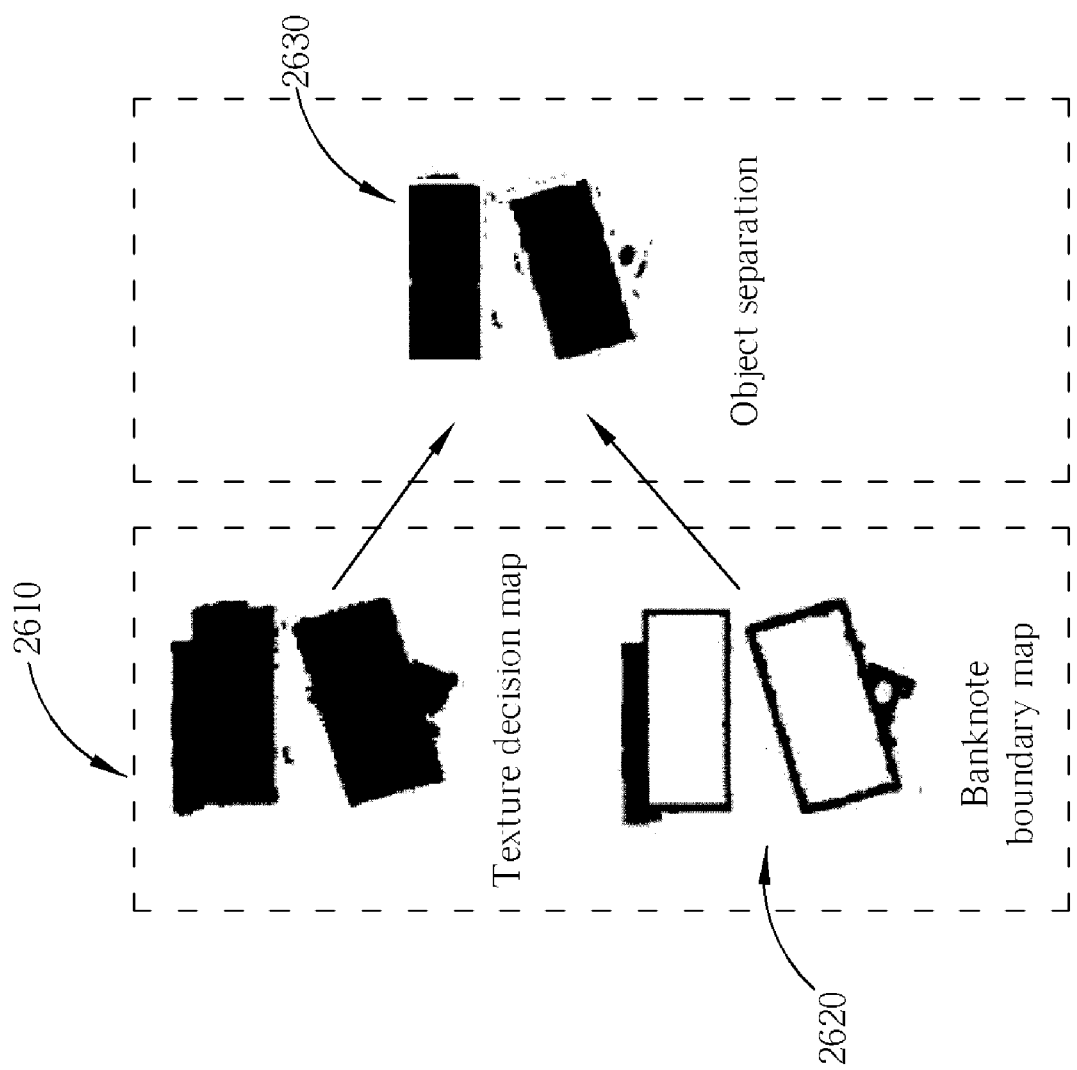
FIG. 26 is another exemplary embodiment illustrating the object determination step 140 of FIG. 1.

FIGS. 25 and 26 illustrate the object determination 140 step. In FIG. 25 a texture decision map 2510 is shown having texture sections of three overlapping banknotes. The banknote boundary map 2520 contains the border sections outlining the three banknotes. When the texture sections corresponding to the border sections are removed, the three banknotes are then separated in object separation 2530. FIG. 26 illustrates a similar example, but with the texture decision map 2610 containing two banknote regions having surrounding background noise. In this case, as the texture sections for the two banknote areas are already separated, object determination 140 manages to remove the redundant noise to more properly define the banknote regions. Texture sections in the texture decision map 2610 that correspond to border sections in the banknote boundary map 2620 are removed, with the results shown in object separation 2630. True banknote areas and residual objects remain, all of which will be verified in the following step for correspondence with valid monetary banknotes.

Texture Property Value Determination 150

Having identified and isolated a number of objects in object determination 140, texture property value determination 150 focuses on calculation of a texture property value for each of the individual objects. This texture property value will then be compared to known values corresponding to valid monetary banknotes to verify whether the texture of the relevant object agrees with the valid monetary banknote.

The exact calculation for the texture property value can vary according to the different embodiments of the present invention. Typically, it is calculated according to a texture feature map (as previously described), which possesses a texture feature value for each section of the scanned image. The texture feature map therefore already contains texture characteristics of the scanned image. Texture feature values for the image sections that correspond to the object in question are used in calculation of the texture property value of the object.

In one embodiment, the texture feature map is a gray level feature map having gray levels as the texture feature value for each verification section. In other embodiments, the texture feature map can be a contrast feature map having contrast values as the texture feature value for each verification section, or even halftone feature map having halftone values as the texture feature value for each verification section. The exact type or format of the texture feature map and corresponding texture feature value for image sections is intermediate, as long as the texture feature map suffices in characterizing verification sections of the scanned image in terms of texture. The principles taught in the present invention are equally applicable for any type of texture map which may be implemented.

With a texture feature map selected, the texture property value can then be determined. The preferred embodiment jointly utilizes a mean value and a variance value of the texture feature values for verification sections corresponding to the object in calculation of the texture property value. However, other embodiments may singularly use a mean value, or just a variance value in calculation of the texture property value. Again, the exact calculation or formulae pertaining to the texture property value can vary, and is intermediate, as long as an appropriate texture feature map is utilized that characterizes verification sections of the scanned image in terms of texture. The principles taught in the present invention are equally applicable regardless of the precise calculation and implementation of the texture property value.

In order to provide a further degree of resolution in calculating the texture property value, an additional embodiment of the present invention utilizes a second texture feature map having a second texture feature value for each verification section in the texture property value calculation. The use of two texture feature maps reduces variability in the calculation, as now it utilizes two distinct texture feature aspects relating to the scanned image.

Similar to the first texture feature map, the second texture feature map can be a gray level feature map having gray levels as the second texture feature value for each verification section, a contrast feature map having contrast values as the second texture feature value for each verification section, or a halftone feature map having halftone values as the second texture feature value for each verification section. Again, the exact type or format of the second texture feature map and corresponding second texture feature value is intermediate, as the teachings of the present invention are equally applicable for any type of second texture map implemented.

Shape Property Value Determination 160

Shape property value determination 160 focuses on calculating a shape property value for each of the identified objects. The shape property value will then be compared to known values corresponding to valid monetary banknotes to verify whether the shape of the relevant object agrees with that of the valid monetary banknote.

The specific formulae for calculating the shape property value can vary according to a number of embodiments. In one embodiment, the shape property value for each object simply comprises determining an area of the object. This may include utilizing four corners of the object to determine the area of the object. Other embodiments can additionally include: determining a distance between center points of two different diagonal lines within the object, determining lengths of two parallel lines within the object, determining an inner product using four angles within the object, and determining a ratio of a width of the object and a height of the object.

Although the exact calculation of the shape property value can vary according to different embodiments, its exact representation is intermediate, as the teachings of the present invention are equally applicable for any calculation for shape property value implemented.

Object Removal 170

With texture property values and shape property values determined for each object, the object removal 170 focuses on removing objects that do not correspond to a valid monetary banknote. This is accomplished by further removing texture sections from the texture decision map corresponding to objects, which do not have a texture property value within a first predetermined range, and a shape property value within a second predetermined range.

In the preferred embodiment of the invention, the first predetermined range corresponds to valid texture property values of valid monetary banknotes. The second predetermined range corresponds to valid shape property values of valid monetary banknotes. Therefore, should an identified object have both a texture property value and shape property value within the above valid ranges (both corresponding to a valid monetary banknote), its corresponding texture sections are left in the texture decision map to verify a location of valid monetary banknote within the scanned image. Otherwise, if either the texture property value or shape property value of the object are not within the above respective ranges, their corresponding texture sections are removed from the texture decision map.

Figure 27:
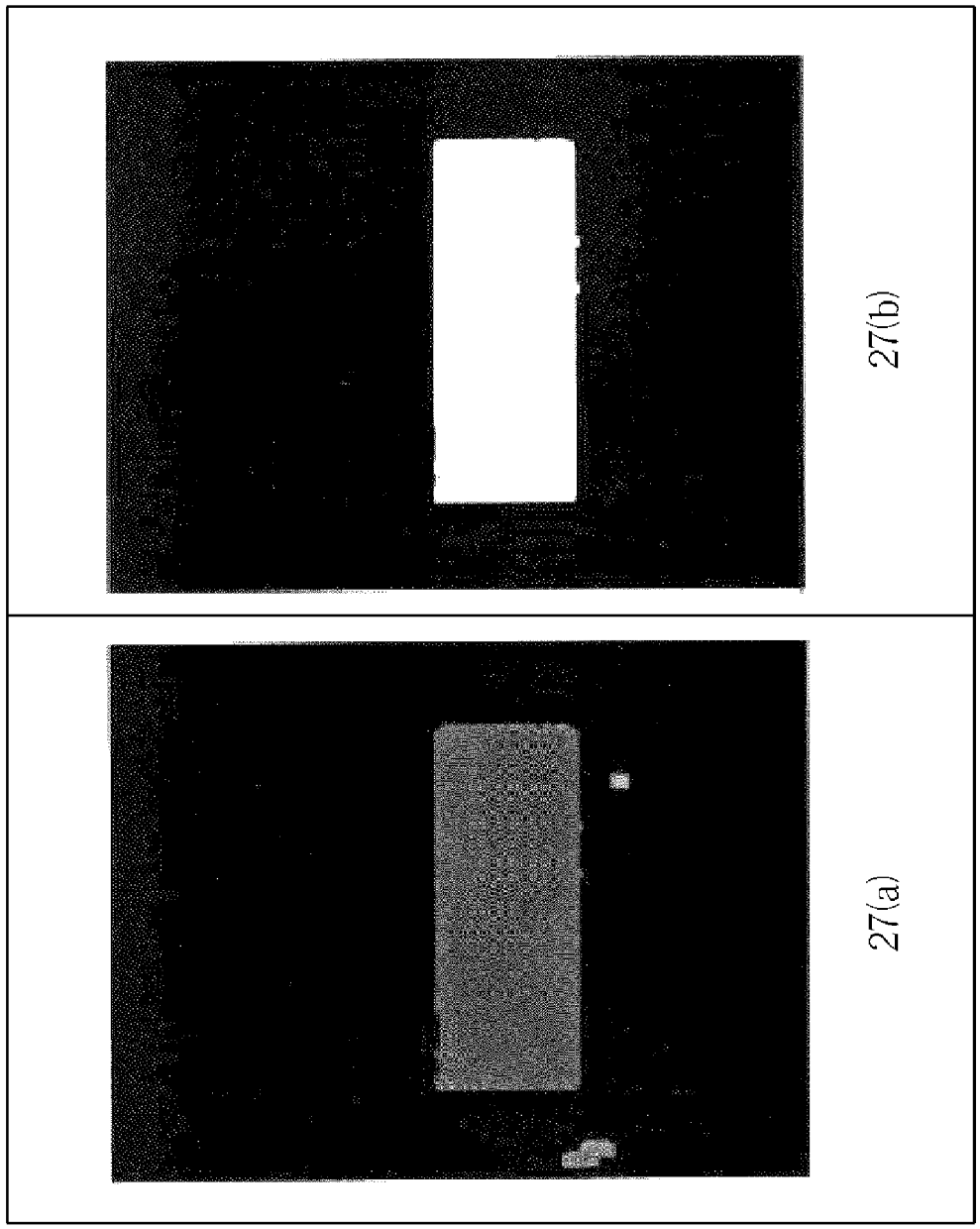
FIG. 27 is an embodiment illustrating object removal according to the present invention.

FIG. 27 illustrates an example of object removal 170 according to the present invention. 27 (*a*) illustrates a texture decision map with three identified objects. Although texture property values are calculated for all three objects, it is evident that the smaller objects on the left, and below, clearly do not correspond with that of a valid monetary banknote. In 27(b), the smaller objects described above are removed upon Object removal 170, as they do not have shape property values within the second predetermined range that corresponds to a typical shape of a valid monetary banknote.

Figure 28:
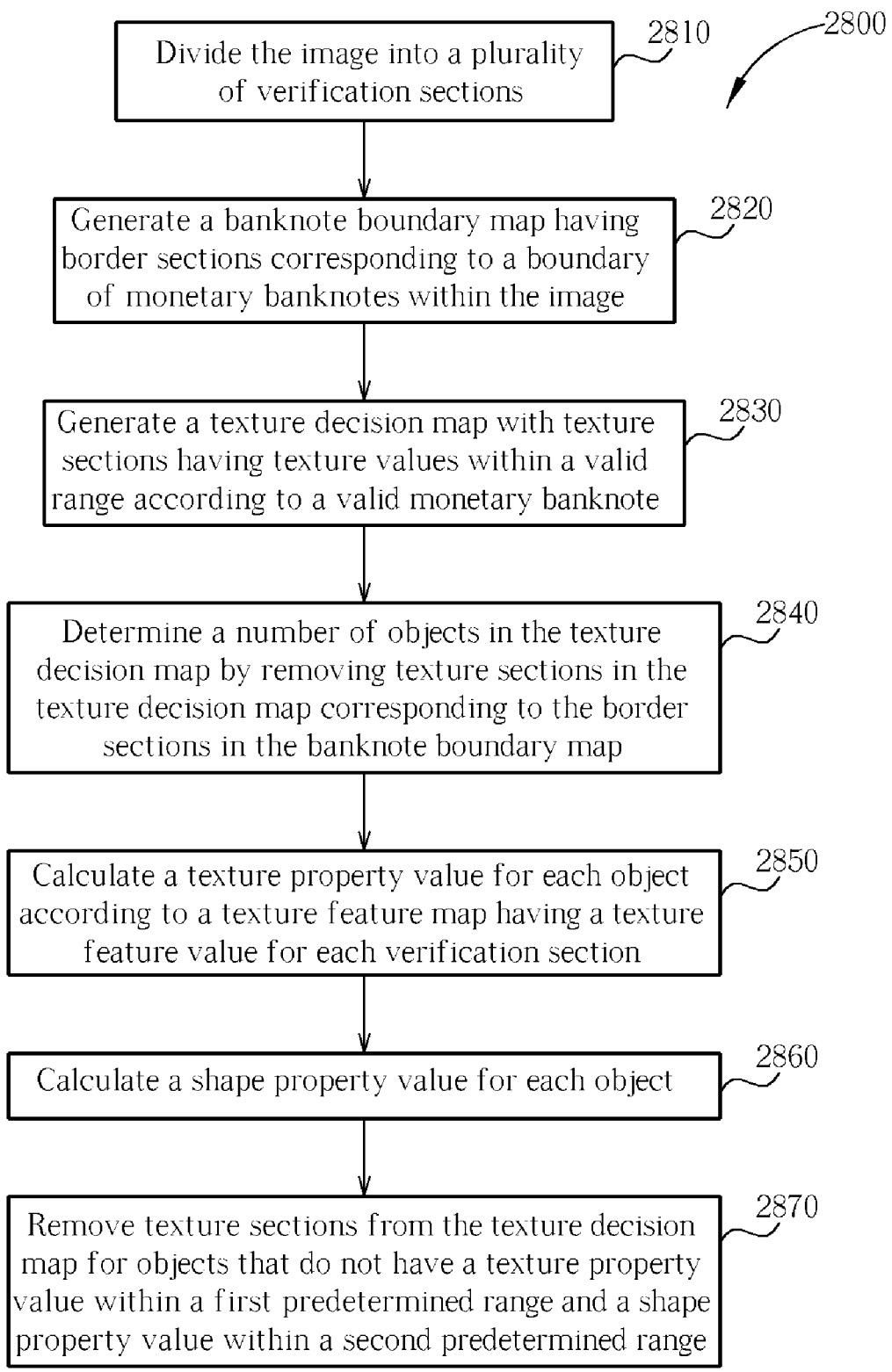
FIG. 28 is a process flow chart illustrating an embodiment of the verification method for determining areas within an image corresponding to monetary banknotes.

A process flow chart for the verification method for determining areas within an image corresponding to monetary banknotes is presented in FIG. 28. Provided that substantially the same result is achieved, the steps of process 2800 need not be in the exact order shown and need not be contiguous, that is, other steps can be intermediate. The method comprises:

Step 2810: Divide the image into a plurality of verification sections

Figure 29:
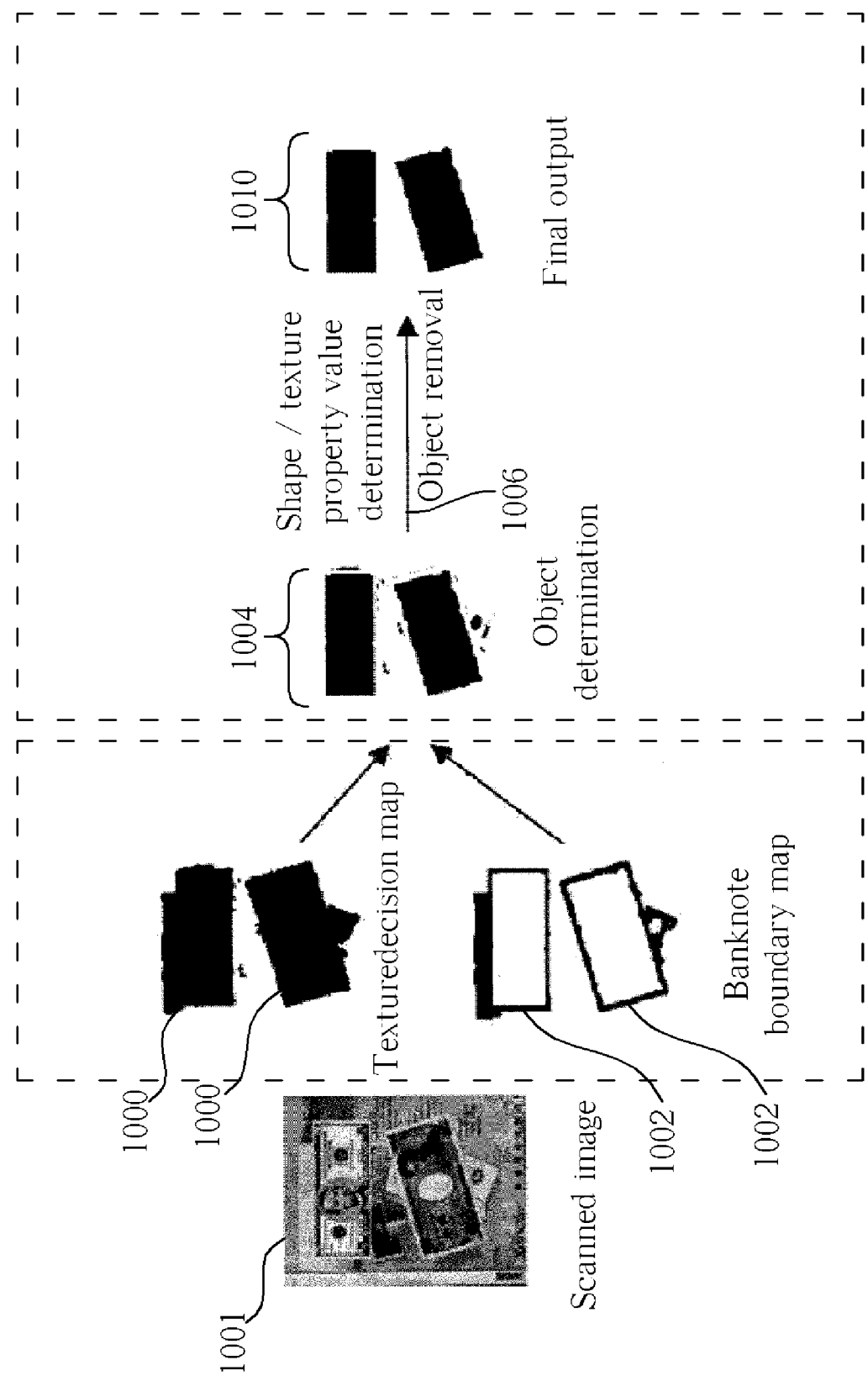
FIG. 29 is an exemplary step-by-step visual illustration detailing the verification method of FIG. 28.
Figure 30:
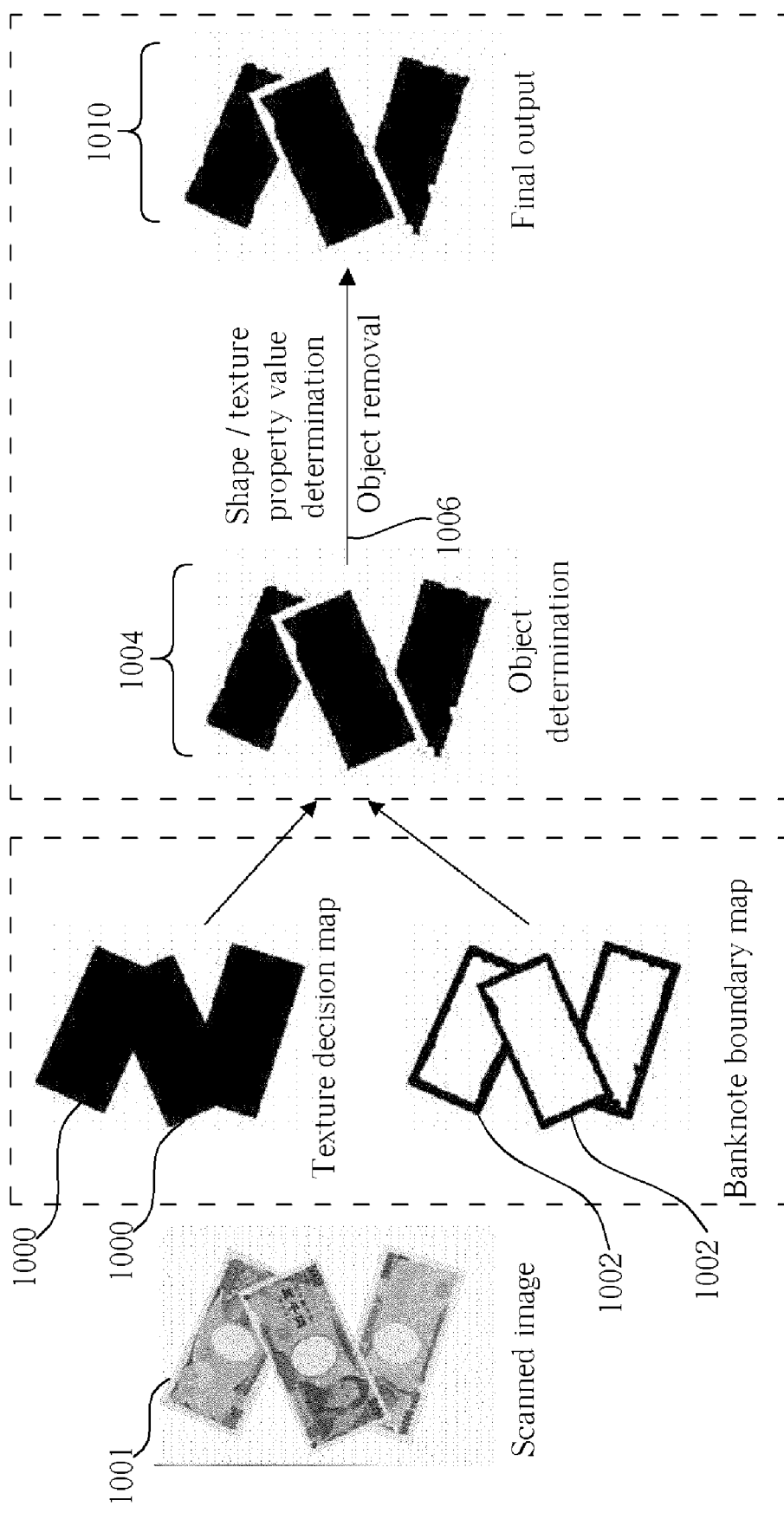
FIG. 30 is an additional exemplary step-by-step visual illustration detailing the verification method of FIG. 28.

Step 2820: Generate a banknote boundary map having border sections corresponding to a boundary of monetary banknotes within the image Step 2830: Generate a texture decision map having texture sections, the texture sections each having a texture value within a valid range according to a valid monetary banknote Step 2840: Determine a number of objects in the texture decision map by removing texture sections in the texture decision map that correspond to the border sections in the banknote boundary map Step 2850: Calculate a texture property value for each object according to a texture feature map having a texture feature value for each verification section Step 2860: Calculate a shape property value for each object Step 2870: Remove texture sections from the texture decision map corresponding to objects that do not have the texture property value within a first predetermined range and the shape property value within a second predetermined range FIGS. 29 and 30 illustrate a complete step-by-step verification process as detailed above. In both cases, a texture decision map 1000 and banknote boundary map 1002 are derived from a scanned image 1001. Information from these two maps 1000, 1002 are combined in object determination to identify and isolate potential objects 1004 relating to banknote locations. Shape property values and texture property values are then determined for each object 1004. In object removal 1006, objects 1004 not having texture property values in a first predetermined range and the shape property values in a second predetermined range are then removed. The final output 1010 illustrates verified locations corresponding to valid monetary banknotes within the scanned image 1001. The above detailed present invention therefore provides a verification method for determining areas within an image corresponding to monetary banknotes. Characteristics of the scanned image are compared with that of known values and/or ranges of valid monetary banknotes for verifying banknote locations within the image.

The method can be applied for use in the detection of counterfeit currency. The scanned image can contain the sample monetary banknote while superimposed onto any arbitrary background, contain multiple isolated or independent banknotes, have overlapping banknotes, or have arbitrary rotational and shift alignments.

Use of the present invention method not only provides an increased means of security measures when used in application for counterfeit banknote detection, it also provides ease of integration with common hardware devices and a viable low cost approach. Accurate detection rates, with low false detection frequencies can therefore be attained. The method is also robust and flexible enough to be applied to different image types and conditions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A verification method for determining areas within an image corresponding to monetary banknotes, the method comprising:
   dividing the image into a plurality of verification sections;
   generating a banknote boundary map having border sections corresponding to a boundary of valid monetary banknotes within the image;
   generating a texture decision map from the image having texture sections, the texture sections each having texture values within a valid range according to a valid monetary banknote, wherein generating the texture decision map includes:
      dividing the image into a plurality of feature sections;
      generating a texture feature map having texture values for each feature section;
         including the border sections within the texture sections;
      selecting feature sections having texture values within a first texture value threshold range as potential texture sections;
      determining an average texture value for surrounding feature sections of each potential texture section; and
      further including potential texture sections having surrounding feature sections with the average texture value within a second texture value threshold range within the texture sections;
   determining a number of objects in the texture decision map by removing texture sections in the texture decision map that correspond to the border sections in the banknote boundary map;
   calculating a texture property value for each object according to a texture feature map having a texture feature value for each verification section;
   calculating a shape property value for each object; and
   further removing texture sections from the texture decision map corresponding to objects that do not have the texture property value within a first predetermined range and the shape property value within a second predetermined range.

2. The method of claim 1 wherein generating the banknote boundary map comprises:
   dividing the image into a plurality of image sections;
   generating a color feature map containing color histogram data for each image section;
   generating a gray level feature map indicating a gray level value for each image section;
   recording border sections onto the banknote boundary map as the image sections having color histogram data within a predetermined color range and gray level values within a predetermined gray level range;
   removing internal border sections enclosed by perimeter border sections from the banknote boundary map; and
   selecting the perimeter border sections as the border sections on the banknote boundary map.

3. The method of claim 2 wherein the color histogram data for each image section comprises a width of a color histogram for a first color, a median value of the color histogram for the first color, a width of a color histogram for a second color, a median value of the color histogram for the second color, a width of a color histogram for a third color, and a median value of the color histogram for the third color.

4. The method of claim 3 wherein the color histogram data is red green blue (RGB) color histogram data.

5. The method of claim 2 wherein the predetermined color range is determined according to color histogram data for a boundary of a valid monetary banknote.

6. The method of claim 2 wherein the predetermined gray level range is determined according to gray levels for a boundary of a valid monetary banknote.

7. The method of claim 2 wherein removing internal border sections enclosed by perimeter border sections from the banknote boundary map further comprises removing a number of border sections greater than a threshold number.

8. The method of claim 2 wherein removing internal border sections enclosed by perimeter border sections from the banknote boundary map further comprises removing a number of internal border sections
corresponding to a predetermined surface area.

9. The method of claim 2 further comprising generating a color binary decision map indicating probable sections corresponding to the monetary banknotes; and recording the border sections onto the banknote boundary map as the probable sections having color histogram data within the predetermined color range and gray levels within the predetermined gray level range.

10. The method of claim 9 wherein the probable sections of the color binary decision map are determined according to a frequency of occurrence of the color histogram data within the valid monetary banknote.

11. The method of claim 9 wherein generating the color binary decision map further comprises:
dividing the image into a plurality of decision sections
extracting color histogram data for each decision section;
assigning a color vector for each decision section according to the color histogram data of the decision section;
comparing the color vector for each decision section to a color lookup table to determine a probability of the decision section corresponding to monetary banknotes;
selecting color sections from decision sections having the probability exceeding a first predetermined threshold;
comparing color vectors for surrounding sections of each color section to the color lookup table;
determining an average probability of the surrounding sections corresponding to monetary banknotes;
selecting bill sections from color sections, the bill sections having surrounding sections with the average probability being greater than a second predetermined threshold;
comparing pixels contained within the bill sections with a pixel lookup table to determine matching pixels; and
recording the location of the matching pixels as probable sections in the color binary decision map.

12. The method of claim 11 further comprising:
removing noise in the color binary decision map according to a noise removal algorithm;
separating objects in the color binary decision map through a flood-fill algorithm; and
defining boundaries for the objects in the color binary decision map through a morphological dilation algorithm.

13. The method of claim 11 further comprising determining the average probability of the surrounding sections corresponding to monetary banknotes according to the frequency of occurrence of color vectors of the surrounding sections in the lookup table.

14. The method of claim 11 wherein the pixel lookup table is created by extracting color histogram data for pixels of the valid monetary banknote, and counting a frequency of occurrence for different values of color histogram data for pixels of the valid monetary banknote.

15. The method of claim 11 further comprising determining matching pixels according to the frequency of occurrence of the color histogram data of the pixels in the pixel lookup table.

16. The method of claim 11 wherein the color vector for each decision section is defined according to color histogram data through a six dimensional space, the six dimensional space comprising the width of the first color, the width of the second color, the width of the third color, the median value of the first color, the median value of the first color minus the median value of the second color, and the median value of the first color minus the median value of the third color.

17. The method of claim 11 further comprising creating the color lookup table by dividing an image of the valid monetary banknote into a number of table sections, extracting color histogram data for each table section, assigning a color vector for each table section according to the color histogram data of the test section, and counting a frequency of occurrence of each assigned color vector within the valid monetary banknote.

18. The method of claim 11 further comprising determining the probability of the decision section corresponding to monetary banknotes according to the frequency of occurrence in the color lookup table.

19. The method of claim 11 wherein the decision sections are substantially equal to the image sections.

20. The method of claim 1 wherein the texture feature map is a gray level map having gray level values as the texture values for each feature section, the first texture value threshold range corresponding to a gray level of the valid monetary bill, and the second texture value threshold range also corresponding to a gray level of the valid monetary bill.

21. The method of claim 1 wherein the texture feature map is a halftone map having halftone values as the texture values for each feature section, the first texture value threshold range corresponding to halftone values of the valid monetary bill, and the second texture value threshold range also corresponding to halftone values of the valid monetary bill.

22. The method of claim 21 wherein the halftone values for each feature section are determined according to a color range and a color gradient range of pixels within the feature section.

23. The method of claim 22 wherein the color range and the color gradient range of pixels within the feature section are determined according to a color hue of the pixels within the YUV color domain.

24. The method of claim 22 wherein the color range and the color gradient range of pixels within the feature section are determined according to a color hue of the pixels within the YCbCr color domain.

25. The method of claim 1 wherein the texture feature map is a binary edge map having edge values as the texture values for each feature section, the first texture value threshold range corresponding edge values of the valid monetary bill, and the second texture value threshold range also corresponding to edge values of the valid monetary bill.

26. The method of claim 25 wherein the binary edge map is generated by:
comparing gray level values of pixels within the feature sections to a predetermined threshold level;
assigning pixels with gray level values greater than the predetermined threshold to a first value;
assigning pixels with gray level values lower than the predetermined threshold to a second value; and
mapping assigned values of the pixels onto the binary edge map.

27. The method of claim 26 further comprising determining edge values for each feature section by:

determining a first frequency of alternating of values in a first direction of the binary edge map;

determining a second frequency of alternating of values in a second direction of the binary edge map;

determining a third frequency of alternating of values in a third direction of the binary edge map;

determining a fourth frequency of alternating values in a fourth direction of the binary edge map; and calculating the edge value according to the first frequency, the second frequency, the third frequency, and the fourth frequency.

28. The method of claim 27 further comprising determining the edge value for each feature section according to a maximum frequency, a minimum frequency, and a difference between the maximum frequency and the minimum frequency for each of the first frequency, the second frequency, the third frequency, and the fourth frequency.

29. The method of claim 1 wherein calculating the texture property value for each object comprises generating a mean value of the texture feature values for verification sections corresponding to the object.

30. The method of claim 1 wherein calculating the texture property value for each object comprises generating a variance value of the texture feature values for verification sections corresponding to the object.

31. The method of claim 1 wherein calculating the texture property value for each object comprises generating a mean value and a variance value of the texture feature values for verification sections corresponding to the object.

32. The method of claim 1 wherein the texture feature map is a gray level feature map having gray levels as the texture feature value for each verification section.

33. The method of claim 1 wherein the texture feature map is a contrast feature map having contrast values as the texture feature value for each verification section.

34. The method of claim 1 wherein the texture feature map is a halftone feature map having halftone values as the texture feature value for each verification section.

35. The method of claim 1 wherein calculating the texture property value for each object further comprises utilizing a second texture feature map having a second texture feature value for each verification section.

36. The method of claim 35 wherein the second texture feature map is a gray level feature map having gray levels as the second texture feature value for each verification section.

37. The method of claim 35 wherein the second texture feature map is a contrast feature map having contrast values as the second texture feature value for each verification section.

38. The method of claim 35 wherein the second texture feature map is a halftone feature map having halftone values as the second texture feature value for each verification section.

39. The method of claim 1 wherein calculating the shape property value for each object comprises determining an area of the object.

40. The method of claim 39 further comprising utilizing four corners of the object to determine the area of the object.

41. The method of claim 1 wherein calculating the shape property value for each object comprises determining a distance between center points of two different diagonal lines within the object.

42. The method of claim 1 wherein calculating the shape property value for each object comprises determining lengths of two parallel lines within the object.

43. The method of claim 1 wherein calculating the shape property value for each object comprises determining an inner product using four angles within the object.

44. The method of claim 1 wherein calculating the shape property value for each object comprises determining a ratio of a width of the object and a height of the object.

45. The method of claim 1 wherein the first predetermined range corresponds to valid texture property values of valid monetary banknotes.

46. The method of claim 1 wherein the second predetermined range corresponds to valid shape property values of valid monetary banknotes.

47. The method of claim 1 wherein the valid monetary banknote is of United States of America currency.

48. The method of claim 1 wherein the valid monetary banknote is of Japan currency.

49. The method of claim 1 wherein the plurality of verification sections are a plurality of blocks.

50. The method of claim 1 wherein the verification sections are overlapping.

* * * * *